(12) United States Patent
Smith et al.

(10) Patent No.: US 7,612,716 B2
(45) Date of Patent: Nov. 3, 2009

(54) CORRELATION OF FLIGHT TRACK DATA WITH OTHER DATA SOURCES

(75) Inventors: Alexander E. Smith, McLean, VA (US); Bennett Cohen, Alexandria, VA (US)

(73) Assignee: Era Systems Corporation, Reston, VA (US)

( * ) Notice: Subject to any disclaimer, the term of this patent is extended or adjusted under 35 U.S.C. 154(b) by 0 days.

(21) Appl. No.: 11/758,072

(22) Filed: Jun. 5, 2007

(65) Prior Publication Data
US 2008/0036659 A1    Feb. 14, 2008

Related U.S. Application Data

(60) Division of application No. 11/209,030, filed on Aug. 22, 2005, now Pat. No. 7,248,219, which is a division of application No. 10/830,444, filed on Apr. 23, 2004, now Pat. No. 7,123,192, which is a division of application No. 10/457,439, filed on Jun. 10, 2003, now Pat. No. 6,885,340, which is a continuation-in-part of application No. 10/319,725, filed on Dec. 16, 2002, now Pat. No. 6,812,890, which is a continuation-in-part of application No. 09/516,215, filed on Feb. 29, 2000, now Pat. No. 6,633,259.

(60) Provisional application No. 60/123,170, filed on Mar. 5, 1999.

(51) Int. Cl.
*G01S 3/02* (2006.01)
(52) U.S. Cl. .................... 342/454; 342/456
(58) Field of Classification Search ............ 342/450, 342/454, 455, 456; 701/14, 120; 340/947, 340/948
See application file for complete search history.

(56) References Cited

U.S. PATENT DOCUMENTS 1,738,571 A    12/1929    Gare .................. 404/18

(Continued)

FOREIGN PATENT DOCUMENTS

| DE | 4306660 A1 | 8/1974 |
|---|---|---|
| DE | 4204164 A1 | 8/1993 |
| DE | 19751092 A1 | 6/1999 |
| DE | 10149006 A1 | 4/2003 |
| DE | 202004007747 U1 | 9/2004 |

(Continued)

OTHER PUBLICATIONS

*Application of Markov Process to Pavement Management Systems at the Network Level*, Abbas Ahmad Butt, University of Iillinois at Urbana-Champaign (1991).

(Continued)

*Primary Examiner*—Dao L Phan
(74) *Attorney, Agent, or Firm*—Robert Platt Bell

(57) ABSTRACT

A method and apparatus for providing live display of aircraft flight information obtains aircraft data from at least two data sources selected from aircraft position and flight information from an ASDI (aircraft situational awareness display to industry) data source, aircraft location and identification from multilateration of an aircraft transponder data source, flight information from an ACARS (Aircraft Communications Addressing and Reporting System) data source, and flight information from an airline flight information system data source. The data is then fused together to integrate aircraft information from at least two of the data sources to produce integrated aircraft information, and providing a real-time display of the integrated aircraft flight information over a network, a physically connected display, a cockpit display, or an airport ground vehicle display.

10 Claims, 9 Drawing Sheets

U.S. PATENT DOCUMENTS

| | | | |
|---|---|---|---|
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/961 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,694,322 A | 12/1997 | Westerlage et al. | 364/464.27 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,314 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |

| Patent | Date | Inventor | Class |
|---|---|---|---|
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,147,748 A | 11/2000 | Hughes | 356/4.09 |
| 6,161,097 A | 12/2000 | Glass et al. | 705/6 |
| 6,178,363 B1 | 1/2001 | McIntyre et al. | 701/16 |
| 6,188,937 B1 | 2/2001 | Sherry et al. | 701/14 |
| 6,195,040 B1 | 2/2001 | Arethens | 342/357.12 |
| 6,195,609 B1 | 2/2001 | Pilley et al. | 701/120 |
| 6,201,499 B1 | 3/2001 | Hawkes et al. | 342/387 |
| 6,208,284 B1 | 3/2001 | Woodell et al. | 342/30 |
| 6,208,937 B1 | 3/2001 | Huddle | 701/221 |
| 6,211,811 B1 * | 4/2001 | Evers | 342/36 |
| 6,219,592 B1 | 4/2001 | Muller et al. | 701/9 |
| 6,222,480 B1 | 4/2001 | Kuntman et al. | 342/30 |
| 6,225,942 B1 | 5/2001 | Alon | 342/59 |
| 6,230,018 B1 | 5/2001 | Watters et al. | 455/456 |
| 6,233,522 B1 | 5/2001 | Morici | 701/208 |
| 6,239,739 B1 | 5/2001 | Thomson et al. | 342/96 |
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,278,965 B1 * | 8/2001 | Glass et al. | 703/22 |
| 6,282,487 B1 | 8/2001 | Shiomi et al. | 701/120 |
| 6,282,488 B1 * | 8/2001 | Castor et al. | 701/120 |
| 6,289,280 B1 | 9/2001 | Fernandez-Corbaton | 701/214 |
| 6,292,721 B1 | 9/2001 | Conner et al. | 701/9 |
| 6,311,127 B1 | 10/2001 | Stratton et al. | 701/213 |
| 6,314,361 B1 | 11/2001 | Yu et al. | 701/120 |
| 6,314,363 B1 | 11/2001 | Pilley et al. | 701/120 |
| 6,317,663 B1 | 11/2001 | Meunier et al. | 701/16 |
| 6,321,091 B1 | 11/2001 | Holland | 455/456 |
| 6,327,471 B1 | 12/2001 | Song | 455/440 |
| 6,329,947 B2 | 12/2001 | Smith | 342/418 |
| 6,337,652 B1 | 1/2002 | Shiomi et al. | 342/37 |
| 6,338,011 B1 | 1/2002 | Furst et al. | 701/1 |
| 6,339,745 B1 | 1/2002 | Novik | 701/208 |
| 6,340,935 B1 | 1/2002 | Hall | 340/932.2 |
| 6,340,947 B1 | 1/2002 | Chang et al. | 342/357.01 |
| 6,344,820 B1 | 2/2002 | Shiomi et al. | 342/174 |
| 6,347,263 B1 | 2/2002 | Johnson et al. | 701/14 |
| 6,348,856 B1 | 2/2002 | Jones et al. | 340/10.1 |
| 6,366,240 B1 | 4/2002 | Timothy et al. | 342/417 |
| 6,377,208 B2 | 4/2002 | Chang et al. | 342/357.01 |
| 6,380,869 B1 | 4/2002 | Simon et al. | 340/945 |
| 6,380,870 B1 | 4/2002 | Conner et al. | 340/970 |
| 6,384,783 B1 | 5/2002 | Smith et al. | 342/387 |
| 6,393,359 B1 | 5/2002 | Flynn et al. | 701/120 |
| 6,396,435 B1 | 5/2002 | Fleischhauer et al. | 342/70 |
| 6,408,233 B1 | 6/2002 | Solomon et al. | 701/35 |
| 6,414,629 B1 | 7/2002 | Curcio | 342/357.08 |
| 6,415,219 B1 | 7/2002 | Degodyuk | 70/117 |
| 6,420,993 B1 | 7/2002 | Varon | 342/36 |
| 6,445,310 B1 | 9/2002 | Bateman et al. | 340/970 |
| 6,445,927 B1 | 9/2002 | Kng et al. | 455/456 |
| 6,448,929 B1 | 9/2002 | Smith et al. | 342/456 |
| 6,459,411 B2 | 10/2002 | Frazier et al. | 342/455 |
| 6,462,674 B2 | 10/2002 | Ohmura et al. | 340/901 |
| 6,463,383 B1 | 10/2002 | Baiada et al. | 701/120 |
| 6,469,654 B1 | 10/2002 | Winner et al. | 342/33 |
| 6,469,655 B1 | 10/2002 | Franke et al. | 342/36 |
| 6,469,664 B1 | 10/2002 | Michaelson et al. | 342/357.13 |
| 6,473,027 B1 | 10/2002 | Alon | 342/37 |
| 6,473,694 B1 | 10/2002 | Akopian et al. | 701/213 |
| 6,477,449 B1 | 11/2002 | Conner et al. | 701/4 |
| 6,492,932 B1 | 12/2002 | Jin et al. | 342/25 |
| 6,493,610 B1 | 12/2002 | Ezaki | 701/3 |
| 6,504,490 B2 | 1/2003 | Mizushima | 340/943 |
| 6,518,916 B1 | 2/2003 | Ashihara et al. | 342/70 |
| 6,522,295 B2 | 2/2003 | Baugh et al. | 342/453 |
| 6,531,978 B2 | 3/2003 | Tran | 342/29 |
| 6,542,809 B2 | 4/2003 | Hehls, III | 701/120 |
| 6,542,810 B2 | 4/2003 | Lai | 701/120 |
| 6,545,631 B2 | 4/2003 | Hudson et al. | 342/30 |
| 6,549,829 B1 | 4/2003 | Anderson et al. | 701/16 |
| 6,563,432 B1 | 5/2003 | Millgard | 340/961 |
| 6,567,043 B2 | 5/2003 | Smith et al. | 342/450 |
| 6,571,155 B2 | 5/2003 | Carriker et al. | 701/3 |
| 6,584,400 B2 | 6/2003 | Beardsworth | 701/120 |
| 6,584,414 B1 | 6/2003 | Green et al. | 702/33 |
| 6,587,079 B1 | 7/2003 | Rickard et al. | 342/387 |
| 6,606,034 B1 | 8/2003 | Muller et al. | 340/970 |
| 6,606,563 B2 | 8/2003 | Corcoran, III | 701/301 |
| 6,615,648 B1 | 9/2003 | Ferguson et al. | 73/146 |
| 6,617,997 B2 | 9/2003 | Ybarra et al. | 342/29 |
| 6,618,008 B1 | 9/2003 | Scholz | 342/427 |
| 6,633,259 B1 | 10/2003 | Smith et al. | 342/456 |
| 6,657,578 B2 | 12/2003 | Stayton | 342/30 |
| 6,680,687 B2 | 1/2004 | Phelipot | 342/29 |
| 6,690,295 B1 | 2/2004 | De Boer | 340/951 |
| 6,690,296 B2 | 2/2004 | Corwin et al. | 340/961 |
| 6,690,618 B2 | 2/2004 | Tomasi et al. | 367/127 |
| 6,691,004 B2 | 2/2004 | Johnson | 701/14 |
| 6,707,394 B2 | 3/2004 | Ishihara et al. | 340/970 |
| 6,710,719 B1 | 3/2004 | Jones et al. | 340/825.49 |
| 6,710,723 B2 | 3/2004 | Muller | 340/970 |
| 6,714,782 B1 | 3/2004 | Monot et al. | 455/431 |
| 6,721,652 B1 | 4/2004 | Sanqunetti | 701/207 |
| 6,744,396 B2 | 6/2004 | Stone et al. | 342/36 |
| 6,750,815 B2 | 6/2004 | Michaelson et al. | 342/357.13 |
| 6,751,545 B2 | 6/2004 | Walter | 701/120 |
| 6,760,387 B2 | 7/2004 | Langford et al. | 375/267 |
| 6,765,533 B2 | 7/2004 | Szajnowski | 342/465 |
| 6,789,011 B2 | 9/2004 | Baiada et al. | 701/120 |
| 6,789,016 B2 | 9/2004 | Bayh et al. | 701/301 |
| 6,792,058 B1 | 9/2004 | Hershey et al. | 375/347 |
| 6,798,381 B2 | 9/2004 | Benner et al. | 342/450 |
| 6,799,114 B2 | 9/2004 | Etnyre | 701/120 |
| 6,801,152 B1 | 10/2004 | Rose | 342/13 |
| 6,801,155 B2 | 10/2004 | Jahangir et al. | 342/90 |
| 6,809,679 B2 | 10/2004 | LaFrey et al. | 342/37 |
| 6,810,329 B2 | 10/2004 | Koga | 701/211 |
| 6,812,890 B2 | 11/2004 | Smith et al. | 342/454 |
| 6,816,105 B2 | 11/2004 | Winner et al. | 342/37 |
| 6,819,282 B1 | 11/2004 | Galati et al. | 342/37 |
| 6,823,188 B1 | 11/2004 | Stern | 455/456.1 |
| 6,828,921 B2 | 12/2004 | Brown et al. | 340/945 |
| 6,845,362 B2 | 1/2005 | Furuta et al. | 705/13 |
| 6,861,982 B2 | 3/2005 | Forstrom et al. | 342/387 |
| 6,861,982 B2 | 3/2005 | Walter | 701/120 |
| 6,862,519 B2 | 3/2005 | Mizushima | 702/26 |
| 6,862,541 B2 | 3/2005 | Miyasaka et al. | 701/213 |
| 6,873,269 B2 | 3/2005 | Tran | 340/961 |
| 6,873,903 B2 | 3/2005 | Baiada et al. | 701/120 |
| 6,876,859 B2 | 4/2005 | Anderson et al. | 455/456.1 |
| 6,882,930 B2 | 4/2005 | Trayford et al. | 701/117 |
| 6,885,340 B2 | 4/2005 | Smith et al. | 342/465 |
| 6,900,760 B2 | 5/2005 | Groves | 342/357.14 |
| 6,912,461 B2 | 6/2005 | Poreda | 701/120 |
| 6,927,701 B2 | 8/2005 | Schmidt et al. | 340/959 |
| 6,930,638 B2 | 8/2005 | Lloyd et al. | 342/453 |
| 6,952,631 B2 | 10/2005 | Griffith et al. | 701/13 |
| 6,963,304 B2 | 11/2005 | Murphy | 342/357.02 |
| 6,967,616 B2 | 11/2005 | Etnyre | 342/182 |
| 6,977,612 B1 | 12/2005 | Bennett | 342/357.07 |
| 6,985,103 B2 | 1/2006 | Ridderheim et al. | 342/30 |
| 6,985,743 B2 | 1/2006 | Bajikar | 455/456.1 |
| 6,992,626 B2 | 1/2006 | Smith | 342/454 |
| 7,006,032 B2 | 2/2006 | King et al. | 342/29 |
| 7,012,552 B2 | 3/2006 | Baugh et al. | 340/945 |
| 7,026,987 B2 | 4/2006 | Lokshin et al. | 342/357.12 |
| 7,030,780 B2 | 4/2006 | Shiomi et al. | 340/961 |
| 7,043,355 B2 | 5/2006 | Lai | 701/120 |

| Patent No. | Date | Inventor | Class |
|---|---|---|---|
| 7,050,909 B2 | 5/2006 | Nichols et al. | 701/301 |
| 7,053,792 B2 | 5/2006 | Aoki et al. | 340/928 |
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |
| 7,218,276 B2 | 5/2007 | Teranishi | 342/357.1 |
| 7,218,278 B1 | 5/2007 | Arethens | 342/367.03 |
| 7,221,308 B2 | 5/2007 | Burton et al. | 342/42 |
| 7,228,207 B2 | 6/2007 | Clarke et al. | 701/3 |
| 7,233,545 B2 | 6/2007 | Harvey, Jr. et al. | 367/127 |
| 7,248,963 B2 | 7/2007 | Baiada et al. | 701/120 |
| 7,250,901 B2 | 7/2007 | Stephens | 342/146 |
| 7,257,469 B1 | 8/2007 | Pemble | 701/3 |
| 7,272,495 B2 | 9/2007 | Coluzzi et al. | 701/207 |
| 7,277,052 B2 | 10/2007 | Delaveau et al. | 342/387 |
| 7,286,624 B2 | 10/2007 | Woo et al. | 375/356 |
| 7,307,578 B2 | 12/2007 | Blaskovich et al. | 342/29 |
| 7,308,343 B1 | 12/2007 | Horvath et al. | 701/3 |
| 7,321,813 B2 | 1/2008 | Meunier | 701/10 |
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 * | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0021247 A1 | 2/2002 | Smith et al. | 342/450 |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0009267 A1 | 1/2003 | Dunsky et al. | 701/4 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shing-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson et al. | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0132638 A1 * | 6/2007 | Frazier et al. | 342/455 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |

| | | | | | | |
|---|---|---|---|---|---|---|
| 2008/0158059 A1 | 7/2008 | Bull et al. ............... 342/387 | | EP | 1205732 B1 | 3/2006 |
| 2008/0174472 A1 | 7/2008 | Stone et al. ............... 342/30 | | EP | 1632787 A1 | 3/2006 |
| 2008/0183344 A1 | 7/2008 | Doyen et al. ............... 701/9 | | EP | 1632892 A2 | 3/2006 |
| 2008/0186224 A1 | 8/2008 | Ichiyanagi et al. ........ 342/109 | | EP | 0953261 B1 | 6/2006 |
| 2008/0186231 A1 | 8/2008 | Aljadeff et al. ............ 342/387 | | EP | 1275975 B1 | 6/2006 |
| 2008/0195309 A1 | 8/2008 | Prinzel, III et al. ......... 701/208 | | EP | 1285232 B1 | 6/2006 |
| 2008/0231494 A1 | 9/2008 | Galati ......................... 342/37 | | EP | 1672384 A2 | 6/2006 |
| 2008/0252528 A1 | 10/2008 | Shen et al. ................. 342/451 | | EP | 0987562 B1 | 7/2006 |
| 2008/0266166 A1 | 10/2008 | Schuchman ................. 342/97 | | EP | 1093564 B1 | 11/2006 |
| 2008/0272227 A1 | 11/2008 | Sharpe ...................... 244/3.16 | | EP | 1218694 B1 | 11/2006 |
| 2008/0275642 A1 | 11/2008 | Clark et al. ................ 701/208 | | EP | 1727094 A2 | 11/2006 |
| 2008/0294306 A1 | 11/2008 | Huynh et al. ................. 701/3 | | EP | 1742170 A1 | 1/2007 |
| 2008/0297398 A1 | 12/2008 | Kamimura ................... 342/38 | | EP | 1188137 B1 | 2/2007 |
| 2009/0005960 A1 | 1/2009 | Roberts et al. ............. 701/120 | | EP | 1755356 A1 | 2/2007 |
| 2009/0009357 A1 | 1/2009 | Heen et al. ............ 340/825.09 | | EP | 1463002 B1 | 4/2007 |
| 2009/0012660 A1 | 1/2009 | Roberts et al. ................. 701/3 | | EP | 1361555 B1 | 5/2007 |
| 2009/0012661 A1 | 1/2009 | Louis ............................. 701/9 | | EP | 1798572 A1 | 6/2007 |
| 2009/0015471 A1 | 1/2009 | Shen et al. ............. 342/357.15 | | EP | 1410364 B1 | 10/2007 |
| 2009/0027270 A1 | 1/2009 | Fisher et al. ................ 342/387 | | EP | 1843161 A2 | 10/2007 |
| 2009/0051570 A1 | 2/2009 | Clark et al. ................. 340/971 | | EP | 1860456 A1 | 11/2007 |
| 2009/0055038 A1 | 2/2009 | Garrec et al. ................. 701/17 | | EP | 1884462 A1 | 2/2008 |
| | | | | EP | 1101385 B1 | 3/2008 |
| | FOREIGN PATENT DOCUMENTS | | | EP | 1901090 A1 | 3/2008 |
| DE | 202006005089 U1 | 6/2006 | | EP | 0964268 B1 | 4/2008 |
| DE | 102006009121 A1 | 8/2007 | | EP | 1483755 B1 | 4/2008 |
| EP | 0265902 A2 | 5/1988 | | EP | 1906204 A2 | 4/2008 |
| EP | 0346461 A1 | 12/1989 | | EP | 1912077 A2 | 4/2008 |
| EP | 0466239 | 1/1992 | | EP | 1331490 B1 | 6/2008 |
| EP | 0514826 A1 | 11/1992 | | EP | 1942351 A1 | 7/2008 |
| EP | 0550073 A2 | 7/1993 | | EP | 1327159 B1 | 8/2008 |
| EP | 0574009 A3 | 6/1994 | | EP | 1436641 B1 | 8/2008 |
| EP | 0613110 A1 | 8/1994 | | EP | 1953565 A1 | 8/2008 |
| EP | 0613111 A1 | 8/1994 | | EP | 1483902 B1 | 9/2008 |
| EP | 0614092 A1 | 9/1994 | | EP | 1965219 A1 | 9/2008 |
| EP | 0629877 A1 | 12/1994 | | EP | 1972962 A2 | 9/2008 |
| EP | 0355336 B1 | 8/1995 | | EP | 1975884 A1 | 10/2008 |
| EP | 0670566 A2 | 9/1995 | | EP | 1118011 B1 | 11/2008 |
| EP | 0682332 A1 | 11/1995 | | EP | 1995708 A1 | 11/2008 |
| EP | 0505827 B1 | 6/1996 | | EP | 2000778 A2 | 12/2008 |
| EP | 0385600 B1 | 7/1996 | | EP | 2001004 A2 | 12/2008 |
| EP | 0732596 A2 | 9/1996 | | EP | 2023155 A1 | 2/2009 |
| EP | 0487940 B1 | 1/1997 | | FR | 2708349 A1 | 2/1995 |
| EP | 0774148 A1 | 5/1997 | | FR | 2791778 A1 | 10/2000 |
| EP | 0578316 B1 | 4/1998 | | FR | 2881841 A1 | 8/2006 |
| EP | 0915349 A1 | 5/1999 | | JP | 9-288175 A | 11/1994 |
| EP | 1022580 A3 | 2/2001 | | JP | 6-342061 A | 12/1994 |
| EP | 1118871 A2 | 7/2001 | | JP | 8-146130 A | 5/1996 |
| EP | 0877997 B1 | 12/2001 | | JP | 9-119983 A | 11/1996 |
| EP | 0778470 B1 | 5/2002 | | WO | WO9205456 A1 | 4/1992 |
| EP | 1202233 A1 | 5/2002 | | WO | WO 94/14251 | 6/1994 |
| EP | 0865004 B1 | 7/2002 | | WO | WO9427161 A1 | 11/1994 |
| EP | 1109032 B1 | 3/2003 | | WO | WO9428437 A1 | 12/1994 |
| EP | 1300689 A2 | 4/2003 | | WO | WO9503598 A1 | 2/1995 |
| EP | 1331620 A1 | 7/2003 | | WO | WO9521388 A1 | 8/1995 |
| EP | 1345044 A1 | 9/2003 | | WO | WO9605562 A1 | 2/1996 |
| EP | 1369704 A1 | 12/2003 | | WO | WO9635961 A1 | 11/1996 |
| EP | 1302920 B1 | 2/2004 | | WO | WO9726552 A2 | 7/1997 |
| EP | 1396832 A1 | 3/2004 | | WO | WO9747173 A2 | 12/1997 |
| EP | 1406228 A2 | 4/2004 | | WO | WO9804965 A2 | 2/1998 |
| EP | 1070968 B1 | 5/2004 | | WO | WO9805977 A1 | 2/1998 |
| EP | 1431946 A1 | 6/2004 | | WO | WO9814926 A1 | 4/1998 |
| EP | 1467575 A1 | 10/2004 | | WO | WO9822834 A1 | 5/1998 |
| EP | 1471365 | 10/2004 | | WO | WO9822923 A1 | 5/1998 |
| EP | 0903589 B1 | 11/2004 | | WO | WO9835311 A1 | 8/1998 |
| EP | 1517281 A2 | 3/2005 | | WO | WO9843107 A1 | 10/1998 |
| EP | 1531340 A1 | 5/2005 | | WO | WO9849654 A1 | 11/1998 |
| EP | 0926510 B1 | 8/2005 | | WO | WO9908251 A1 | 2/1999 |
| EP | 1405286 B1 | 9/2005 | | WO | WO9935630 A1 | 7/1999 |
| EP | 1485730 B1 | 9/2005 | | WO | WO9942855 A1 | 8/1999 |
| EP | 1428195 B1 | 10/2005 | | WO | WO9945519 A2 | 9/1999 |
| EP | 1603098 A1 | 12/2005 | | WO | WO 99/50985 | 10/1999 |
| EP | 1125415 B1 | 1/2006 | | WO | WO9956144 A1 | 11/1999 |
| | | | | WO | WO0023816 A1 | 4/2000 |

| | | |
|---|---|---|
| WO | WO0039775 A2 | 7/2000 |
| WO | WO0111389 A1 | 2/2001 |
| WO | WO0133302 A2 | 5/2001 |
| WO | WO0148652 A1 | 7/2001 |
| WO | WO0157550 A1 | 8/2001 |
| WO | WO0159601 A1 | 8/2001 |
| WO | WO0163239 A1 | 8/2001 |
| WO | WO0165276 A1 | 9/2001 |
| WO | WO 0186319 | 11/2001 |
| WO | WO0194969 A2 | 12/2001 |
| WO | WO0205245 A2 | 1/2002 |
| WO | WO0208784 A1 | 1/2002 |
| WO | WO0215151 A1 | 2/2002 |
| WO | WO0227275 A2 | 4/2002 |
| WO | WO02054103 A2 | 7/2002 |
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005038478 A2 | 4/2005 |
| WO | WO2005017555 A2 | 5/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2006088554 A1 | 6/2006 |
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek *Technical Univ. of Pardubice* (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1, Oct. 16, 2006.

Griffiths H D et al., *Denial of Bistatic Hosting By Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B- Proposal Summary, NASA SBIR 02-1 Solicitation, http://sbir.nasa.gov/SBIR/abstracts/02/sbir/ phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.
ASA MASPA—Change Issue, Michael Petri, Oct. 23, 2002.
ASA MASPA—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.

A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

Draft Proposal for the Amendment of the Sub-Cap on Off-Peak Takeoff and Landing Charges at Dublin Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management , Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches a Unique Solution for ADS-B,. Jan. 19, 2005, Raytheon Corp. http://www.raytheon.co.uk/highlights/ATMS.html.

Raytheon Systems Limited's ADS-B Solution Prized by International Air Traffic Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.

Federal Airways & Airspace, Inc. Because Accuracy Matters, Feb. 2003, Jan. 2002.

VDL4 TM Alignment With DO-242A (RTCA ADS-B MASPS) WG51/SG2, NASA, Sep. 2003.

Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke Radar, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp711079482021710.pdf Nov. 2004.
*Cel-Loc How We Do it, Technology Overview*, http://www.cell-loc.com/how$_{13}$ tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, Ltd, Travel Automation Specialists, © 2004, www.damarel.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers*? Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, Siemens, Feb. 10, 2006.
*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Airport Pavement Management Systems: An Appraisal of Erxisting Methodologies, Michel Gendreau and Patrrick Soriano;Pergamon Transn Res. A, vol. 32, No. 3, pp. 187-214, 1998.
*Components of a Pavement Maintenance Management System*, Mohamed Y. Shahin, U.S. Army Construction Engineering Research Laboratory, Transportaiton Research Record 791, pp. 31-39, 1980.
Protest Letter dated May 16, 2002 from Otto M. Wildensteiner, U.S. Department of Transportation, Washington, DC.
"Comparison of Claims in U.S. Appl. No. 09/971,672 with Prior Art", May 16, 2002, Otto M. Wildensteiner, Department of Transportation, Washington, DC.
"Minimum Aviation System Performance Standards for Automatic Dependent Surveillance Broadcast (ADS-B)", RCTA, Inc. Washington, DC, Aug. 1998.
"Runway Incursion Reduction Program Dallas-Ft. Worth Formal Evaluation Report, Final Report", Trios Associates, Inc. Dec. 21, 2000.
"TIS-B DFW Application for Airport Surface Situational Awareness", Trios Associates, Inc., Sep. 6, 2000.
"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.
"The Universal Access Transceiver (UAT)", Warren Wilson & Chris Moody, May 10, 1995.
"Terminal Area Productivity (TAP) Study Low Visibility Landing and Surface Operations (LVLASO) Demonstration Report" Surface Surveillance Products Team (AND-410) Sep. 4, 1998.
"Phase I—Operational Evaluation Final Report Cargo Airline Association ADS-B Program, FAA SafeFlight 21 Program" Apr. 10, 2000.
"Capstone Program Plan Version 1.0", Federal Aviation Administration, Mar. 10, 1999.
"TIS-B Concept and Approach", MITRE, Chris Moody, Feb. 29, 2000.
"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.
"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.
"Minutes of SC-186 WG-2 (TIS-B) Meeting", Jun. 13-14, 2000.
"UK ADS-B in radar environment" (Mark Watson) http://www.eurocontrol.int/cascade/gallery/content/public/documents/Presentations/Session%20%202 %20-%20Trials%20and%20Implementations/Watson%20-%20UK%20ADS-B%20in%20a%20radar%20environment.pdf (2006).
Ground Vehicle Operations on Airports, FAA Advisory Circular AC No. 150/5210-20 Jun. 21, 2002.

* cited by examiner

CORRELATION OF FLIGHT TRACK DATA WITH OTHER DATA SOURCES

CROSS-REFERENCE TO RELATED APPLICATIONS

The present application is a DIVISIONAL of U.S. patent application Ser. No. 11/209,030, filed on Aug. 22, 2005, and incorporated herein by reference; application Ser. No. 11/209,030 is a DIVISIONAL of U.S. patent application Ser. No. 10/830,444, filed on Apr. 23, 2004, and incorporated herein by reference; application Ser. No. 10/830,444 is a DIVISIONAL application of U.S. patent application Ser. No. 10/457,439, filed on Jun. 10, 2003, and incorporated herein by reference; application Ser. No. 10/457,439 in turn is a Continuation-In-Part application of U.S. patent application Ser. No. 09/516,215, filed Feb. 29, 2000, Now U.S. Pat. No. 6,633,259, which is incorporated herein by reference in its entirety, application Ser. No. 09/516,215, filed Mar. 5, 1999, claim priority from Provisional U.S. Patent Application Ser. No. 60/123,170, filed on Mar. 5, 1999, application Ser. No. 10/457,439 is also a Continuation-In-Part of U.S. patent application Ser. No. 10/319,725, filed Dec. 16, 2002, incorporated herein by reference in its entirety.

The subject matter of the present application is related to the following issued U.S. patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data"; and U.S. Pat. No. 6,567,043, issued May 20, 2003, entitled "METHOD AND APPARATUS FOR IMPROVING THE UTILITY OF AUTOMATIC DEPENDENT SURVEILLANCE".

FIELD OF THE INVENTION

The present invention relates to the field of aircraft tracking and identification. The present invention is specifically directed toward a technique for passively retrieving and correlating aircraft data from existing aircraft data sources. Six embodiments of present invention are described wherein aircraft flight track may be calculated and correlated with other data or where flight track data may be enhanced with other data.

BACKGROUND OF THE INVENTION

The Federal Aviation Administration (FAA) requires all passenger carrying aircraft over 30 seats be equipped with so-called "Mode S" transponders. Mode S transponders are capable of transmitting a number (e.g., 25) of formats of coded data. This coded data includes such information as a unique 24-bit binary address for each aircraft.

The aircraft registration number may be derived from this 24-bit binary address. The coded Mode-S data also includes such information as aircraft altitude and may be transmitted continuously throughout a flight at a minimum rate of 1 Hz (i.e., once per second). Coded Mode-S data may be collected passively without any connection to air traffic control equipment.

The FAA has endorsed the Aircraft Communications Addressing and Reporting System (ACARS) system, which uses various data link technologies including the VHF communication band, HF and SATCOM along with a ground station network to allow aircraft to transmit and receive messages of coded data. Many domestic and international carriers have equipped their aircraft with ACARS equipment.

ACARS equipment is capable of transmitting a number of types of coded data. ACARS currently uses frequency shift keying (FSK) as a modulation scheme, however, other modulation schemes including minimum shift keying (MSK) and time division multiple access (TDMA) are being evaluated for future improvement of ACARS. ACARS data includes such information as the aircraft registration number and airline flight identification number (flight number).

ACARS transmissions from a single aircraft may be sent at varying intervals from as little as no transmissions in a single flight to several transmissions per minute. ACARS transmissions may be collected passively without any connection to air traffic control equipment.

None of the currently used or planned Mode S downlink formats provides for the transmission of flight identification data. There are a number of methods including Automatic Dependent Surveillance-Broadcast (ADS-B) and multilateration which allow for the precise determination of aircraft location through the Mode S downlink formats on a frequent basis. ACARS transmissions, while capable of encoding aircraft position and altitude, are not typically used for position determination as the frequency of ACARS transmissions may be too infrequent to allow one to accurately and timely determine the exact position of an aircraft.

Reducing noise from aircraft landing and taking off is a problem in the art. Determining which aircraft are violating noise restrictions is an essential part of the noise reduction problem. In the Prior Art, airports relied on post-processed flight track data (typically from airport radar systems) which would then be correlated with acoustical noise information and presented to management for analysis the next day or several days later. The acoustical data was usually collected by microphones or noise monitoring terminals located (NMTs) around the airport.

These NMTs would generally store a day's worth of noise information and then download that information each night for correlation with the post-processed flight tracks. However, since noise and flight track data may be not correlated until many hours after a noise event, it may be difficult if not impossible to respond to specific noise complaints or noise incidents, or to accurately determine post hoc which airplane caused which noise event. What is needed in the art is a system which allows for almost instantaneous correlation between noise data and flight tracks.

Triangulating on an aircraft's transponder signal may require decoding real-time transponder replies at several locations, time-stamping them and sending them to a central location for matching. Matching would attempt to pair up the transponder signals that had emanated from the same target.

An example of a Prior Art method for triangulating on an aircraft's transponder is disclosed in Wood, M., L., and Bush, R., W., Multilateration on Mode S and ATCRBS Signals at Atlanta's Hartsfield Airport, Lincoln Laboratory Project Report ATC-260, 8 Jan. 1998, incorporated herein by reference. In that method, triangulation on an aircraft's transponder relied on each remote sensor time-stamping all or most received transponder signals and passing them along to the central location for matching.

It was deemed necessary to do this since the remote sensor could not know which particular reply would be used by the central server for the matching process. This meant that a relatively high bandwidth communications medium was required between each remote sensor and the central server.

Such Prior Art methods used active interrogations to elicit the transponder replies, which allowed for some form of expectancy time for the replies. By scheduling interrogations the system estimated when replies might be received at each of the receivers and the system could then use windows in which to "listen" for replies. All replies received within these windows would then be time-stamped and then sent to the central server for matching.

This approach helped in some form to manage the required bandwidth on the link between the receiver and the central server. However, a relatively high bandwidth link is still required using this approach. Because of the practical bandwidth challenges in managing the link between the receivers and the central server it was generally thought in the Prior Art that using a completely passive approach for triangulation and multilateration would be impossible.

Multilateration and ASDI may be augmented with airline flight information available from an airlines flight reservation system. Dunsky et al, U.S. patent application Ser. No. 10/136,865, filed May 1, 2002 (Publication Number 2003/0009261 A1, published Jan. 9, 2003) entitled "Apparatus and method for providing live display of aircraft flight information", incorporated herein by reference, describes the integration of Megadata's PAssive Secondary SUrveillance Radar (PASSUR) and airline flight information.

SUMMARY OF THE INVENTION

The present invention includes hardware, software, and a methodology for correlating flight identification data with aircraft registration numbers. The present invention includes a 1090 MHz receiver, Mode S decoder, ACARS receiver, and ACARS decoder, aircraft registration numbers and other Mode S data are correlated with the current flight identification of an aircraft as well as other data provided from ACARS messages.

The present invention provides for linking (correlation) of flight identification data from ACARS messages with the data from Mode S transponder transmissions, which are more frequent and provide for real time position and altitude determination. The effect of which is to provide the same data as an air traffic controller would see on his or her screen without the need for active interrogation or connection to any Air Traffic Control equipment.

The present application includes six additional embodiments which are improvements and/or enhancements to technology previously developed by the inventors and the assignee of the present application.

In a first embodiment of the present invention, ACARS data may be used to determine aircraft weight and identification. using this information, along with flight track, aircraft thrust may be calculated accurately. From calculated aircraft thrust and flight track, the amount of noise that the aircraft produced may be accurately determined using any one of a number of noise calculation models—and without the need for microphones or noise monitoring devices.

In a second embodiment, Real Time Noise and Flight Tracking is provided. For airport management applications, the surveillance element allows real time flight tracking and complete aircraft identification, which is a feature, which has not previously been available to airport management and other users. Since the flight track information may now be available to the airport in real-time, the airport may make use of noise data from the NMTS in real-time to provide a real-time correlated set of aircraft flight tracks and noise measurements. This correlated set of flight tracks and noise measurements allows the airport to respond in real time to any inquiry such as a noise complaint that may be telephoned into the airport, or to put certain information on a real-time airport noise report, such as might be presented on the Internet at an airport website.

In a third embodiment, a low bandwidth communication path may be used between multiple multilateration sensors and central server. Intelligent processing techniques are used at each of multiple multilateration receivers. Thus, the need to timestamp and send all messages within a time window or continuously over time has been overcome. The technique includes the use of logic or rules at each receiver, which may be applied to incoming replies and effectively filter out unnecessary and redundant replies.

In a fourth embodiment of the present invention, tracking aircraft from radar or transponder signals provides a real-time picture of the aircraft's position as well as identification information. This picture may also be stored and replayed up to the current time for a variety of reasons including airport management and air traffic control. Aircraft positions may be tracked around the airport surface as well as in terminal and en route areas. Fusing ACARS data with this surveillance information adds a variety of other information including aircraft/pilot intent as well as other details.

In a first variation of this fourth embodiment, integration with ASDI may be provided. On its own, the multilateration portion of the present invention provides highly accurate aircraft tracks. Coverage may be dependent on the number and placement of the remote sensors. A large variety of information may be available from the aircraft's registration information which may be provided from the Mode S transponder code. The transponder derived information includes such fields as aircraft make, model, type, serial number, owner, and engine type. In conjunction with other sources such as ACARS, other information may be available on the target such as flight number and aircraft/pilot intent.

In second variation of the fourth embodiment, the tracking system may be used to track ground vehicles around the surface areas of airport thereby building up a complete picture of all moving and stationary traffic around an airport ranging from service vehicles and catering trucks to emergency service vehicles.

In a fifth embodiment of the present invention, the multilateration system provides accurate high update rate surveillance information on each target. The Mode S transponder derived information provides details on the aircraft type including registration, which may be used to determine the avionics equipage in the aircraft.

In a sixth embodiment of the present invention a means for correcting reported aircraft altitude based on pressure (barometric altitude) is provided. Since pressure varies depending on local weather conditions, it may impact the performance of airport management systems that rely on precise altitude information, for example for billing for landing fees, or collision avoidance systems.

DETAILED DESCRIPTION OF THE INVENTION

The present invention is now described with reference to the Figures where like reference numbers denote like elements or steps in the process.

Figure 1:
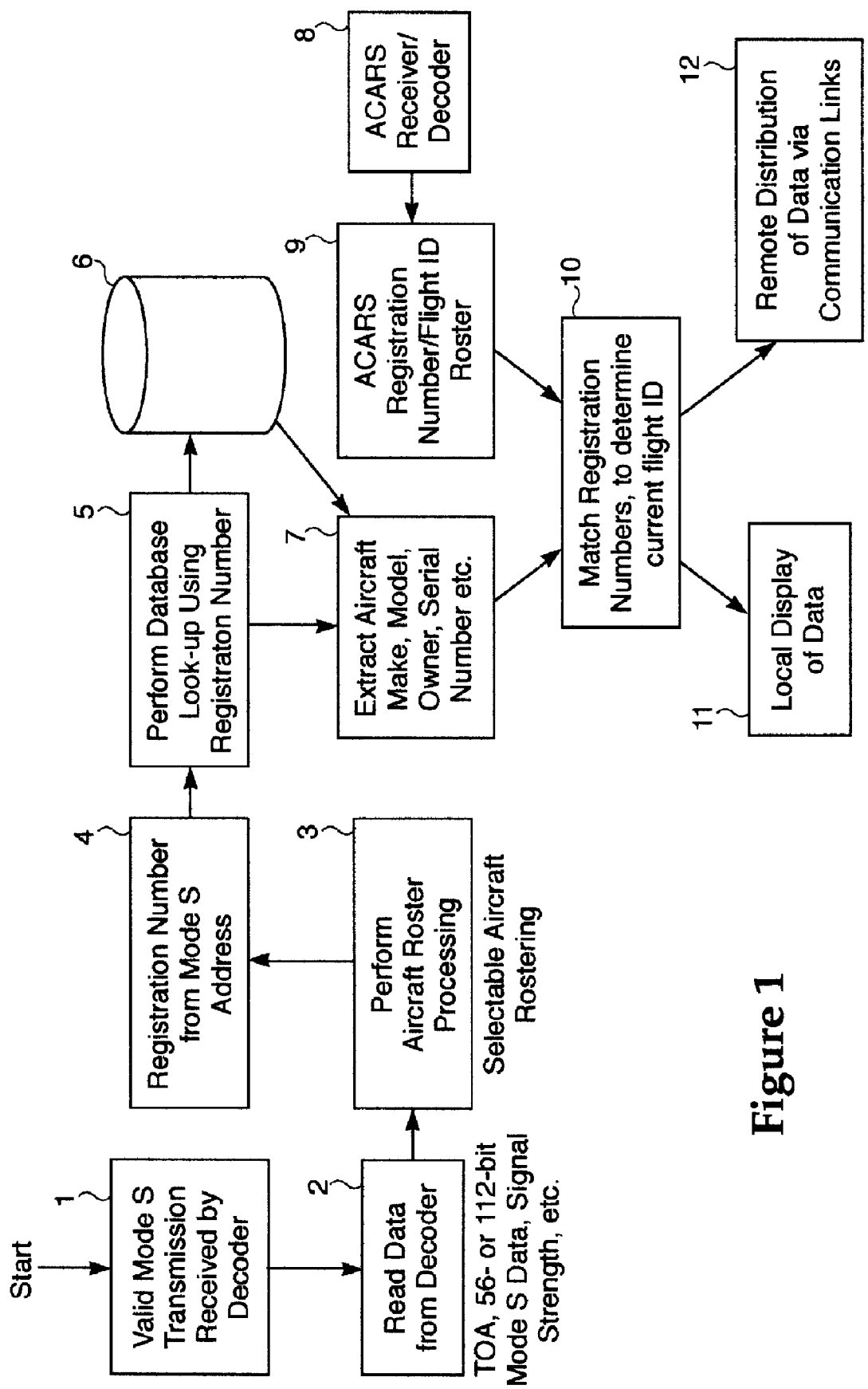
FIG. 1 is a flow chart of a process for decoding secondary surveillance radar transmissions, decoding ACARS transmissions, and correlating flight identifications from ACARS with registration details from both SSR and ACARS.

Referring to FIG. 1, 1090 MHz, Mode S transponder signals are received by a receiver/decoder in step 1. In step 1, the received analog Mode S signal may be converted to digital data. In step 2, the Mode S address may be extracted from the digital data. The Mode S address may then be stored in a roster in step 3 and used to generate the aircraft registration or "N" number, which may be extracted in step 4. U.S. aircraft registration numbers may be determined directly by an algorithm, while foreign aircraft registrations may be determined by a lookup table.

The aircraft registration number from step 4 may then be used to perform a database look-up in step 5. Step 5 utilizes a database 6 which may contain details of aircraft make, model, serial number, owner/operator, owner/operator address, engine type, engine noise class, engine modifications and any other pertinent data associated with a particular aircraft. Such data may be extracted in step 7.

Simultaneously or concurrently with Mode-S decoding, a receiver/decoder capable of receiving and decoding ACARS signals receives and decodes such signals as illustrated in step 8. ACARS transmission may occur over VHF frequencies such as 131.550 MHz, 130.025 MHz, 129.125 MHz, 131.725 MHz, 131.450 MHz, 131.550 MHz, and 131.475 MHz, and/or HF and/or SATCOM and/or any other data link method and/or any other modulation scheme, including VDL Mode 1, 2, 3 or 4.

Aircraft registration number and flight ID number, as well as other ACARS message details, including but not limited to, "Out, Off, On and In" reports, cockpit message reports, fuel reports, peripheral message reports and miscellaneous message reports are then stored in a roster in step 9. Data from step 9 may then be matched with data from step 7. In step 10, aircraft registration numbers from steps 7 and 9 are matched to determine flight identification number.

The flight identification number may be thereby associated with the corresponding aircraft registration number as a result of step 10. If there is no correlation between registration numbers from steps 7 and 10, the data may also be stored. The resultant information from steps 7, 9, and 10 may then be displayed locally over a display terminal in step 11 and/or distributed to remote locations via communication links as illustrated in step 12.

Figure 2:
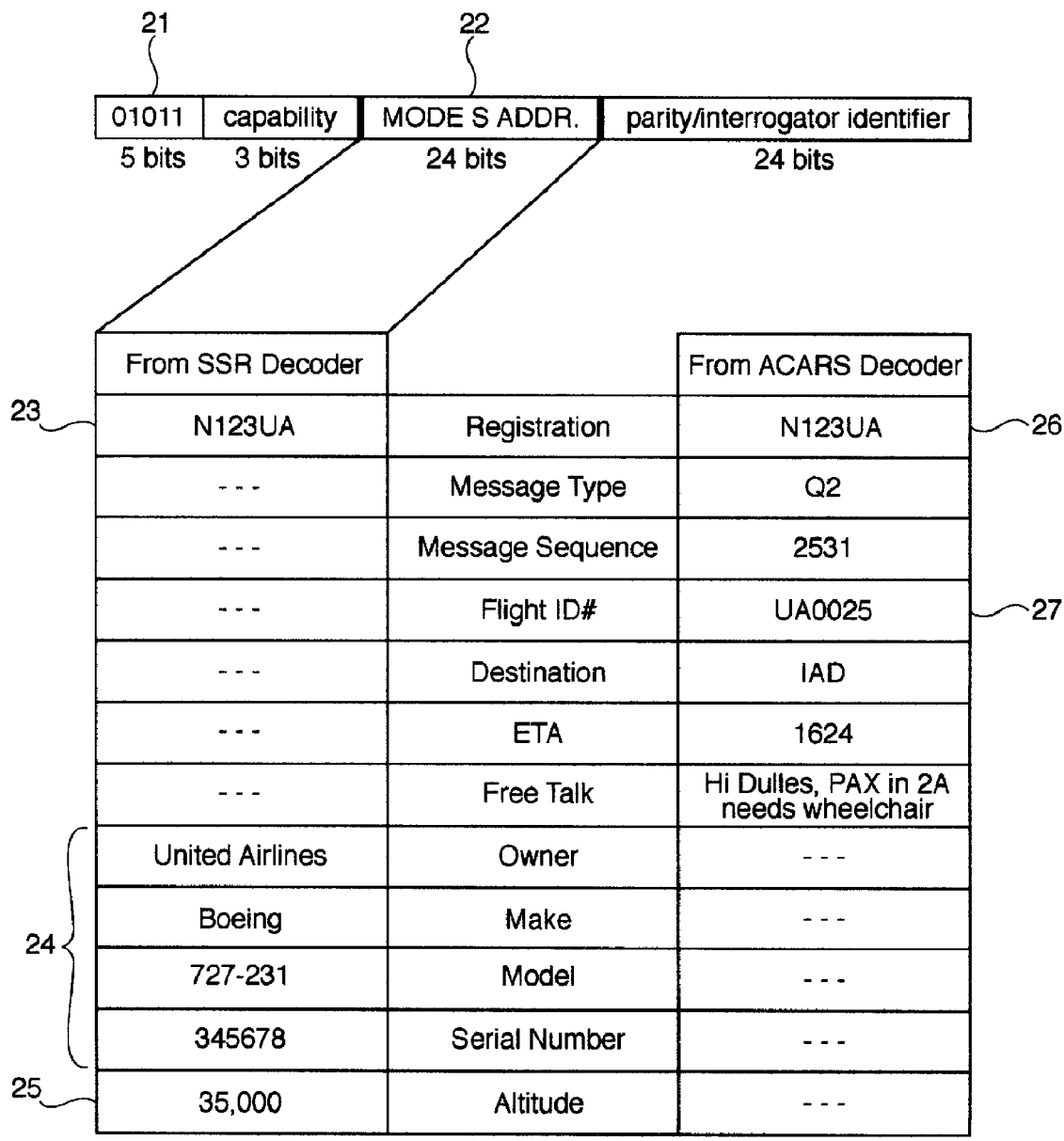
FIG. 2 is a diagram of DF-11 Mode S transponder transmission data and ACARS data, indicating the position of the Mode S address from within a Mode S transmission and illustrating the association between the Mode S address and derived registration data.

Referring to FIG. 2, a DF-11 Mode S transponder transmission 21 may be received and aircraft Mode S address 22 may be extracted. Mode S address 22 may be either converted to a U.S. aircraft registration number 23 through an algorithm or determined to be a non-U.S. registered aircraft whose registration may be looked-up from a database. Data 24 associated with a particular registration number, such as aircraft owner, make, model, and serial number may then be looked-up from a database. Aircraft altitude 25 may be decoded from other Mode S transponder signals, which include altitude information.

Simultaneously or concurrently, ACARS messages are also received and decoded and data such as aircraft registration 26 and flight ID 27, as well as all other ACARS message data may be stored in a database and memory. All the aforementioned data available from the Mode S transponder transmission may then be correlated with ACARS message data by matching registration number 23 from the SSR decoder with registration number 26 from the ACARS decoder.

The resultant correlated data, as illustrated in FIG. 2, contains a host of information specifically identifying an aircraft. Such information, when correlated with multilateration data, may provide a complete and accurate picture of aircraft identity and position. Such information may be useful to an airline in tracking individual aircraft for business planning purposes. In addition, such information may be used for ground tracking purposes (e.g., for noise abatement verification). Moreover, such data may be re-transmitted on a data channel to other aircraft to provide a real-time display of aircraft in the vicinity.

Figure 3:
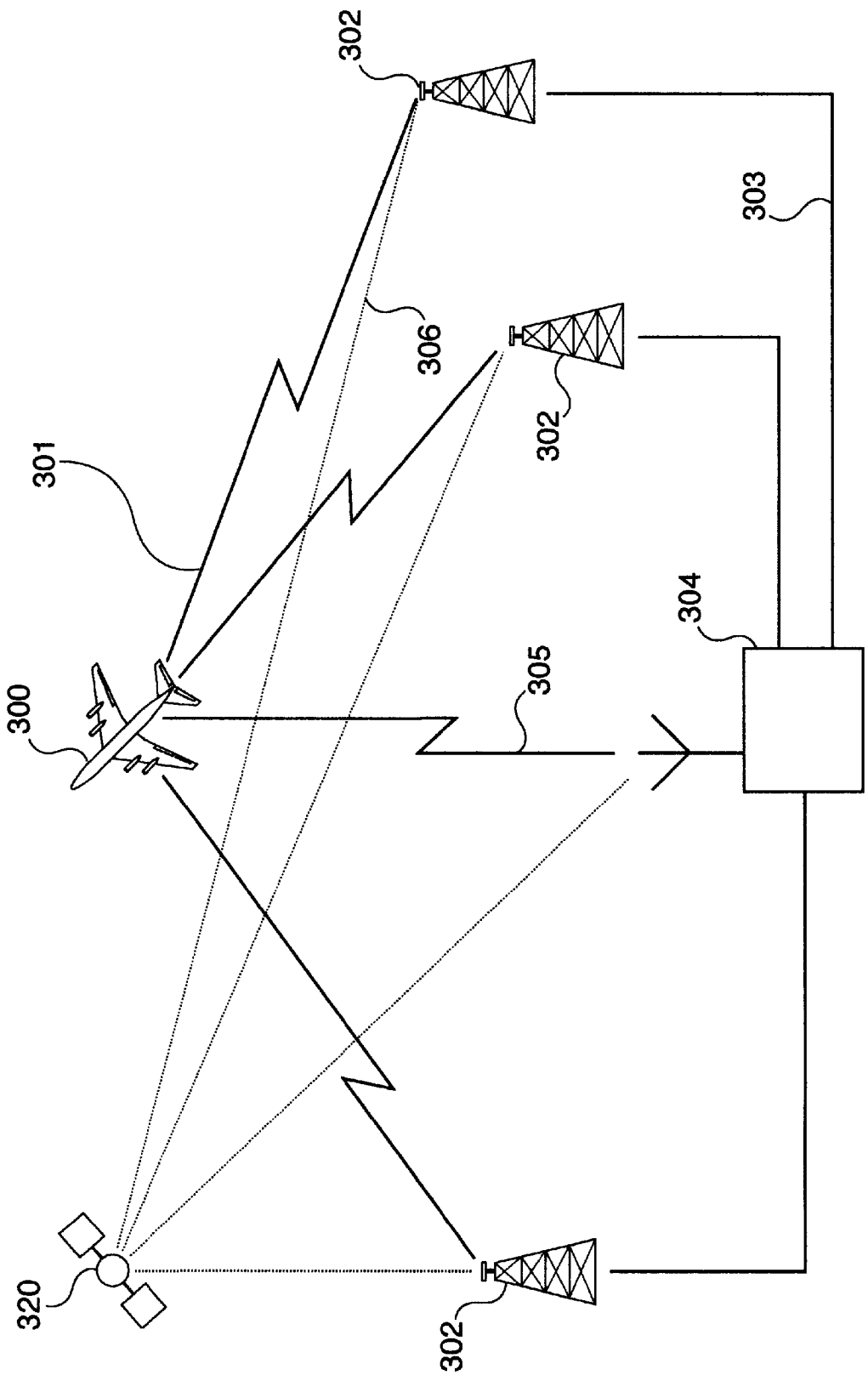
FIG. 3 is a diagram of an aircraft multilateration system that integrates SSR and ACARS data.

Referring to the embodiment depicted in FIG. 3, the integration of ACARS and SSR data is shown with an aircraft multilateration system. Aircraft 300 transmits SSR signals 301 at least once per second. SSR signals 301 may be received at one or more of multiple ground stations 302. The time of arrival at each ground station may be determined by reference to a standard time reference provided by GPS signal 306 from GPS satellite 320.

One or more of ground stations 302 may then send time-stamped SSR data 303 to central workstation 304. Time-stamped SSR data 303 includes the Mode S address of aircraft 300 which may be unique to every aircraft and may be correlated to a registration number. At central workstation 304 a processor then calculates the position of the aircraft using difference time of arrival (DTOA) techniques. The aircraft's location and registration number are then known and may be displayed to a user.

Also at the central workstation 304, ACARS data may be received and modulated, providing a roster or look-up table between registration number and aircraft assigned flight number. Thus, the entire system provides an independent air traffic control picture complete with aircraft position and identification by flight number, using only passive radio reception techniques.

In one preferred embodiment, an adaptive or learning database of aircraft registration information and related details may be implemented as database 6 of FIG. 1. One difficulty in decoding an aircraft Mode S address is that one may not be able to match every address to a unique aircraft identification number without having either a look-up table or conversion algorithm.

For example, in some instances, an aircraft might be brand new and not in the present database or the look-up table might not be available from a particular country of origin. It should be noted that unidentifiable registrations for these reasons are expected to be the minority of aircraft. However, for reasons such as noise monitoring, it may still be important to identify all or as many aircraft as possible.

Figure 4:
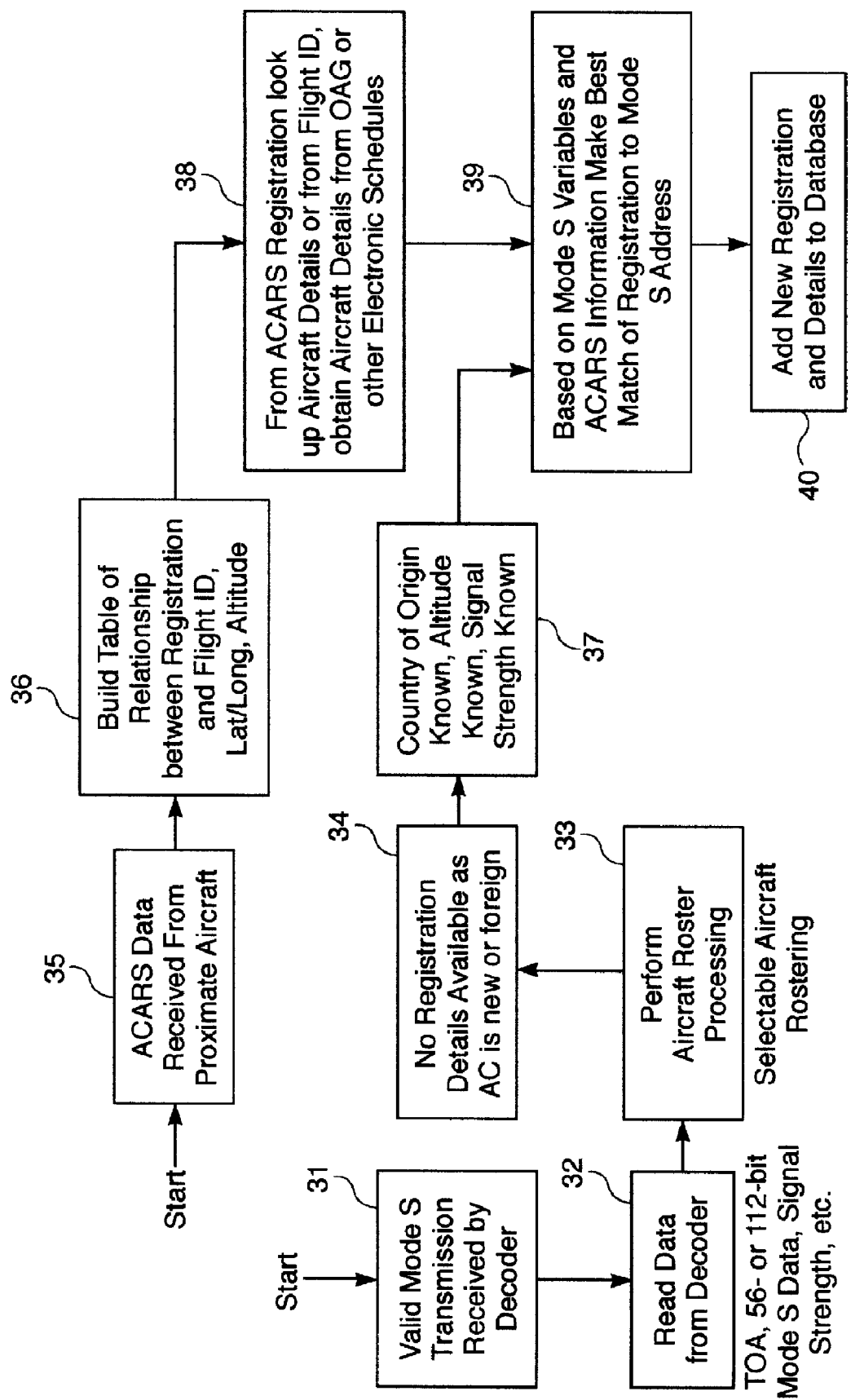
FIG. 4 is a block diagram illustrating the self-learning database system of the preferred embodiment of the present invention.

For this reason it is advantageous to have a database of aircraft Mode S addresses and registrations which may be updated regularly, such as in a preferred embodiment illustrated in FIG. 4 for a self-learning database.

Referring to FIG. 4, a Mode S transmission may be received by a decoder in step 31, and may be read from the decoder in block 32. A roster or table may be built for the aircraft in general area 33. In the example of FIG. 4, because the aircraft may be of foreign registration, no registration look-up may be available as illustrated in step 34. However, the country of origin may be known as are other details provided by Mode S decoding process 37.

Meanwhile, an ACARS receiver receives and processes ACARS data in step 35 and a table may be built in step 36 matching flight number to registration, and other details, based solely upon the ACARS information. Also, details on a particular aircraft may be known from the registration number, by looking up in other commercially available databases, such as the OAG schedule in step 38.

Based on the spatial and other information, a best estimate may be made of the match between the aircraft Mode S address and a registration number in step 39. The new registration/mode S look-up may then be entered into the database 40 for future use.

Since many foreign aircraft may tend to visit the same airports or airspace more than once, (e.g., routine commercial flights), the data acquired using such a technique may be accessed the next time such an aircraft re-visits the airspace. In addition, the system of the present invention may be networked to other such systems over a wide area to share such "learned" data.

Note that this technique may also be used to validate or correct information that may be already in a database. Thus, over a period of time, database data may be corrected or upgraded. Again, such data may be accessed during subsequent visits of an aircraft to an airspace, or may be shared with other systems so as to update a database for an overall network.

In the first embodiment of the present invention, ACARS data may be used to determine aircraft weight and identification. Using this information, along with flight track, aircraft thrust may be calculated accurately. From calculated aircraft thrust and flight track, the amount of noise that the aircraft produced may be accurately determined using any one of a number of noise calculation models.

Sample parts of an ACARS message used by the invention are illustrated in Table I below.

TABLE I

| MESSAGE | DESCRIPTION |
|---|---|
| C-GDSU AC0878 | Aircraft Registration C-CDSU, Flight number |
| YYZ ZRH | Air Canada 878, going from Toronto to Zurich |
| TTL PAX 149 | 149 total passengers on board |
| OA 51, OB 54, OC 44 | 51 in first class, 54 in business class, and 44 in steerage |
| FOB 44.8 | 44,800 kilograms of fuel on board |
| ZFW 108.3 | Zero fuel weight is 108,300 kilograms |
| TOW 152.6 | Actual take off weight is 152,600 kilograms |

For a more complete listing of ACARS messages refer to Flyn, E., Understanding ACARS, Third Edition, Universal Radio Research, 1995, incorporated herein by reference.

Figure 5:
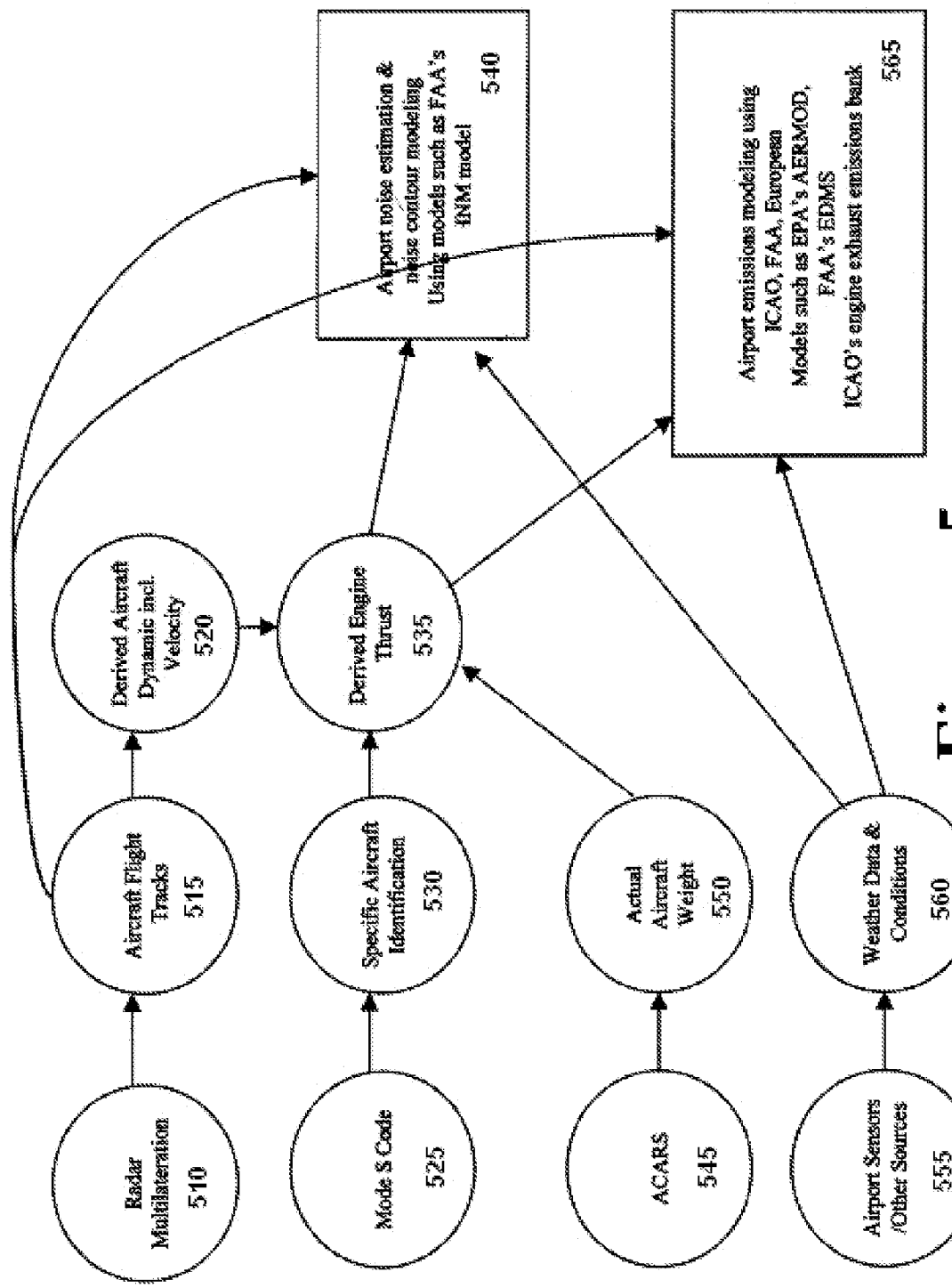
FIG. 5 is a flowchart illustrating the operating steps of the noise estimation and calculation process of the first embodiment of the present invention.

FIG. 5 is a flowchart illustrating the operating steps of the noise and emissions estimation and calculation process of the first embodiment of the present invention. For application to noise monitoring, it may be very useful to know the exact type of aircraft and its registration details, which are available from the transponder information. The aircraft weight information available from the registration may be the aircraft's gross take off weight. While useful, for the purposes of noise monitoring, more useful information may be the aircraft's actual weight, which varies from flight to flight depending on the aircraft's passenger and cargo load as well as fuel on board.

The actual weight of the aircraft, coupled with the exact aircraft and aircraft engine type allows accurate estimation of engine thrust in real time and in a post-processed form. If accurate estimates of engine thrust may be calculated, then a more accurate estimate of the noise produced by aircraft engines may be determined. The method of the first embodiment of the present invention uses a combination of gross take off weight from the aircraft registration details coupled with actual weight information available from aircraft ACARS transmissions. This method therefore provides highly accurate estimates of the aircraft's weight throughout the aircraft's operation.

As a result, a highly accurate modeling of the noise and the emissions around an airport may be produced. Since the government uses highly scientific models to calculate noise and emissions, the whole point is to use a high fidelity source of input. Without knowing the real engine types and the thrust, the methods of the Prior Art may make only rough estimates. The types of emissions modeled in the first embodiment of the present invention include but are not limited to ground level ozone, nitrogen dioxide, and sulfur dioxide.

Referring to FIG. 5, Radar and/or Multilateration block 510 generates data indicating aircraft position in the vicinity of the airport. From this position information, aircraft flight tracks 515 may be generated, providing a three-dimensional flight path data track of individual airplanes in and around an airport of interest. From flight track data in block 515, dynamic aircraft information, such as velocity and acceleration may be derived. For example, integrating flight track data over time may produce velocity data. Integrating velocity data may produce acceleration data. Other information, such as climb rate may be obtained from aircraft tracking data.

In block 525, Mode-S code data may be retrieved from a Mode-S transponder on the aircraft (if so equipped). In block

530, the specific aircraft may be identified from the mode-S data. Block 545 represents receipt of ACARS data from the aircraft. As illustrated above, actual aircraft weight may be obtained from the ACARS data in block 550. As noted in the present application, once specific aircraft identification data has been obtained, data for the airplane, such as engine type (and even serial numbers) may be obtained by correlating aircraft identification data with data from other databases (e.g., FAA).

Aircraft identification data (which may include engine type), along with dynamic aircraft information and aircraft weight, may be fed into block 535 to determine engine thrust. Note that other types of data may also be fed to block 535, such as wind data and other weather information 560, which may affect engine thrust (e.g., headwinds and the like). In block 535, engine thrust may be calculated using one of a number of known algorithms. Since the dynamic aircraft information and aircraft weight are known, mathematical calculations may be made to determine the amount of thrust necessary to produce the resultant flight track for given weather conditions. Fuel burn rates may even be calculated to compensate for decrease in fuel weight as the aircraft travels on its flight path.

Other airport sensors and sources of data 555 including noise monitoring equipment and weather equipment may generate weather data and conditions 560. This data may include atmospheric pressure, wind direction and intensity, humidity, and precipitation. These factors may affect engine operation, noise levels, and emissions.

In block 540, airport noise estimation and noise contour modeling may be generated using, for example, the FAA's Integrated Noise Model (INM), suitably modified for use with the present invention. The latest release of this noise model may be downloaded from the FAA website at http://www.aee.faa.gov/Noise/inm and is incorporated herein by reference in its entirety. Other types of noise modeling may be used within the spirit and scope of the present invention, including proprietary noise modeling methods and the like. Such noise modeling methods may be enhanced in the present invention by providing more accurately calculated thrust measurements (from more accurate weight and flight track data), as well as specific engine type and model data. Noise varies from one engine type and model to another, and with different thrust levels and environmental conditions. Thus the present invention more accurately models noise levels that prior art techniques.

In block 565, airport emissions may be modeled using various known models, suitably modified for use with the present invention. Examples of such emissions models include those produced by the International Civil Aviation Organization (ICAO), the Federal Aviation Administration (FAA), Environmental Protection Agency (EPA) or European models. The ICAO Aircraft Engine Exhaust Emission Databank may be downloaded from http://www.qinetiq.com/aviation_emissions_databank and is incorporated herein by reference in its entirety. The EPA's AERMOD model is described, for example, in AERMOD: DESCRIPTION OF MODEL FORMULATION (Version 0222) EPA 454/R-02-002d, Oct. 31, 2002, incorporated herein by reference in its entirety. The FAA's Emission and Dispersions Modeling System (EDMS) may be downloaded from http://www.aee.faa.gov/emissions/EDMS/EDMShome.htm and is incorporated herein by reference in its entirety.

In a second embodiment of the present invention, for airport management applications, the surveillance element allows real time flight tracking and complete aircraft identification, which may be a feature which has not previously been available to airport management and other users. Since the flight track information may now be available to the airport in real-time, the airport may make use of noise data from the NMTS in real-time to provide a real-time correlated set of aircraft flight tracks and noise measurements.

Real-time noise tracking allows the airport to respond in real time to any inquiry such as a noise complaint telephoned into the airport. In addition, real-time noise tracking allows certain information to be presented in a real-time airport noise report, such as might be presented on the Internet at an airport website.

Figure 6:
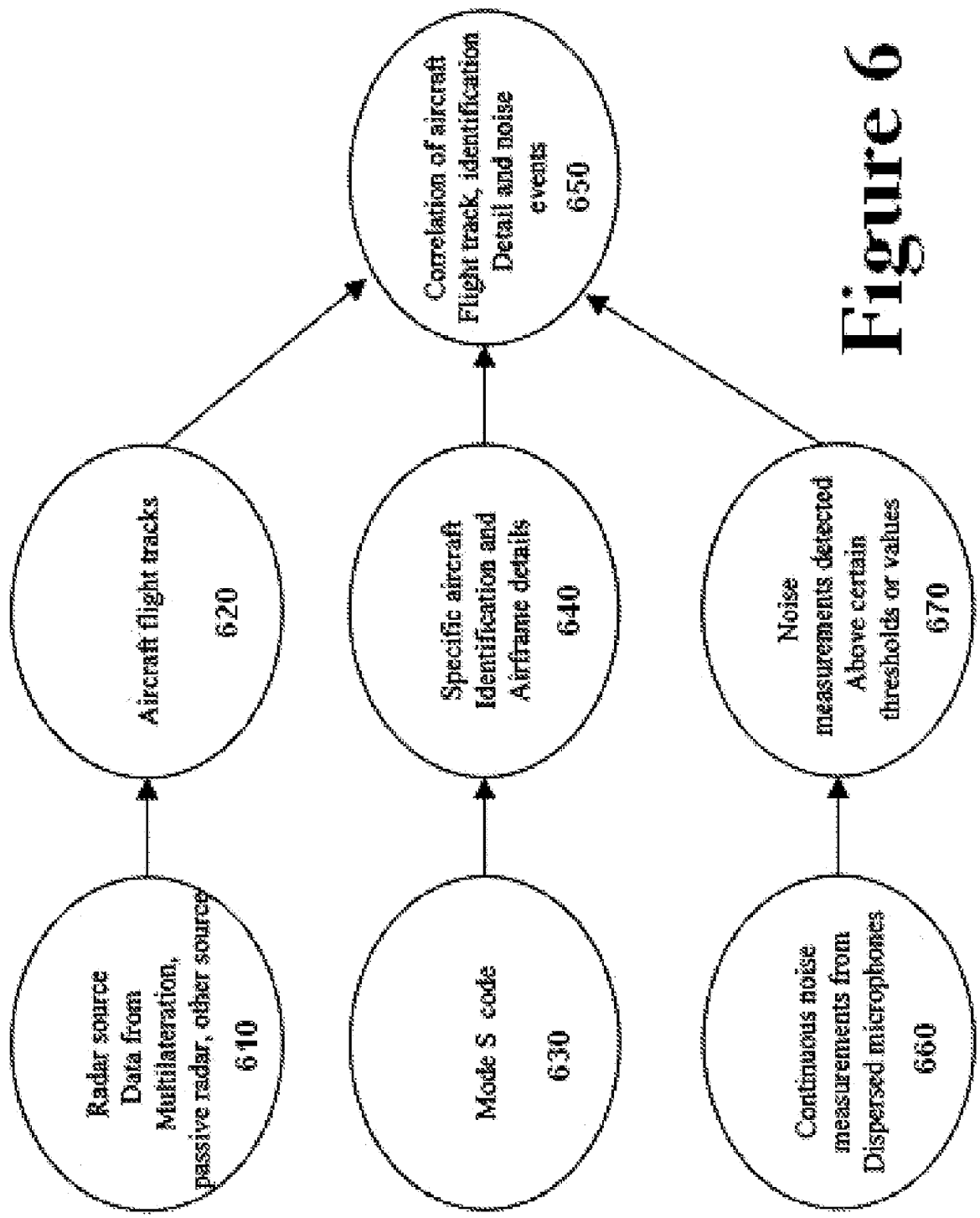
FIG. 6 is a flowchart illustrating the operating steps of the real-time noise tracking system of the second embodiment of the present invention.

FIG. 6 is a flowchart illustrating the operating steps of the real-time noise tracking system of the second embodiment of the present invention. In step 610, radar or tracking source data from multilateration, passive radar, or other sources may be input to the system. In the preferred embodiment, this may comprise multilateration data produced by one or more of the multilateration apparatus produced by the assignee of the present invention, Rannoch Corporation, of Alexandria, Va., and described in the patents and parent applications incorporated by reference above.

The use of multilateration data avoids having to tap into the tower radar data stream. As noted previously, such radar data was typically only available as tape data provided at the end of a day or shift, and thus generally not available in real-time. Tapping into tower radar data in real time may require FAA approval and runs the risk of interfering with tower radar systems, which could be a liability concern. Multilateration, on the other hand, uses an independent set of multilateration equipment that need not be tied to any tower equipment, and thus comprises an independent data stream available in real-time.

In step 620, two or three-dimensional flight tracks are determined for an aircraft, based upon broadcast aircraft identification data and position data (e.g., from multilateration). These flight tracks accurately illustrate the path of the airplane in its approach and departure from an airport. Calculation of a flight track may be a simple as connecting together a series of position data points recorded periodically from multilateration or other techniques. Cubic spline curve smoothing or other curve generating techniques may be used to interpolate data between reported data points. Alternately, flight tracks may be reported as a series of actual position data points.

In step 630, Mode S transponder codes are received. If a multilateration system is used, these Mode-S codes may be received by the same equipment used for flight tracking. As noted above, the mode-S codes themselves may provide a wealth of information about an aircraft. If correlated with an aircraft database, even more information may be retrieved to identify aircraft model and serial number, engine type and serial number, aircraft owner, and the like, as illustrated in step 640.

In step 660, continuous noise measurement may be recorded by microphones or other noise measuring devices strategically located near an airport operating area. These devices may be located near flight tracks, or may be located near sources of noise complaints, or may be portably mounted (e.g., on a mobile van, truck, trailer, or the like). The location of the noise monitoring device relative to the airport may be known or reported by the device. The noise measuring device provides a data stream (analog or digital) of noise conditions at its location, and may be suitably filtered or directed to measure specifically aircraft type noises. Such noise measuring devices are known in the art.

In step 670, a threshold may be applied to the noise measurement device such that only noise levels above a predetermined threshold may be reported. Alternately, this threshold may be used to alert the system to preserve or track data for aircraft when a noise event has occurred. Alternately, all noise data may be reported, and then a noise profile generated to determined which aircraft have potentially violated noise regulations. The use of the noise threshold may be therefore optional, depending upon application. The use of the noise threshold may, however, reduce computational requirements, particularly at busy airports.

In step 650, data from steps 610, 620, 530, 640, 660, and 670 may be combined to correlate flight track, identification detail, and noise events. From flight track data and noise data, the aircraft producing a noise violation (usually due to failure to follow arrival or departure procedures) may be readily identified. Aircraft identification information associated with flight track (e.g., from mode-S data) may be obtained from the correlation of flight track and identification data.

Since this data may include aircraft owner, address, and the like, a modified version of applicant's automated billing system (incorporated previously by reference) may be used to automatically generate noise violation reports and invoices for noise violation fines, and the like. This real-time reporting would also allow airport operators to advise pilots that they are in violation of noise rules. Since many approaching aircraft may use similar flight paths at similar times, other approaching aircraft may be able to adjust their flight paths to reduce noise complaints.

Thus, unlike Prior Art systems, which require an almost manual correlation of recorded noise with recorded flight tracks, many hours after the fact, the present invention provides an automated technique, which may be used in real-time. This real-time feature allows for more careful monitoring of aircraft noise and thus may result in better and more effective noise reduction in the vicinity of airports.

Figure 7:
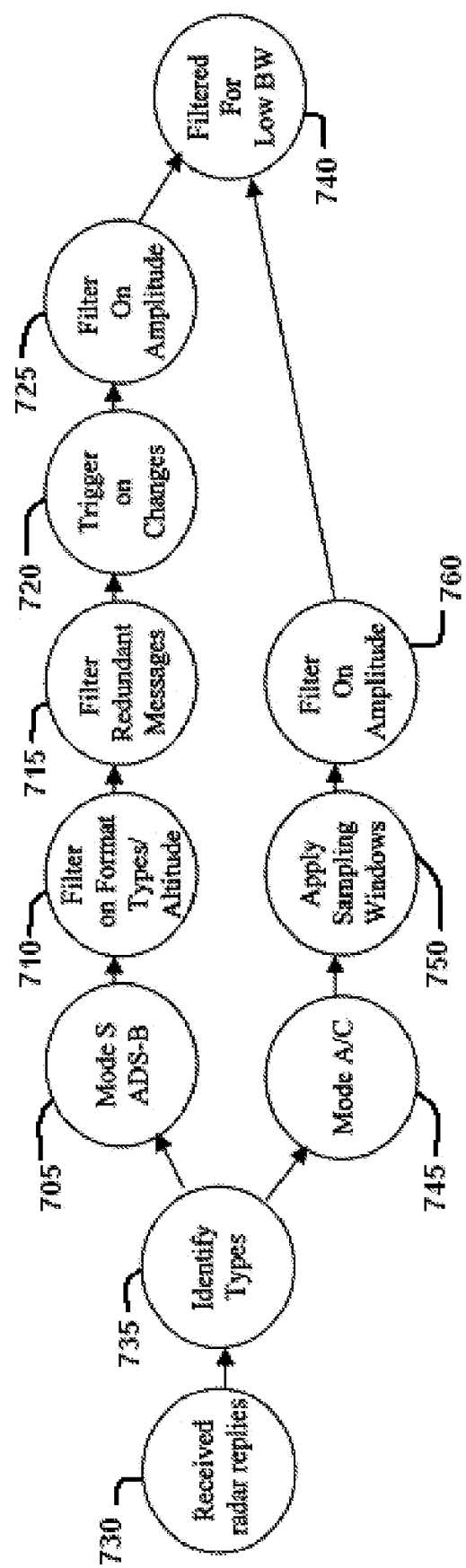
FIG. 7 is a flowchart illustrating the operating steps of the intelligent processing techniques for multiple multilateration receivers of the third embodiment of the present invention.

FIG. 7 is a flowchart illustrating the operating steps of the intelligent processing techniques for multiple multilateration receivers of the third embodiment of the present invention.

In this third embodiment of the present invention, intelligent processing techniques are used at each of multiple multilateration receivers. Thus, the need to timestamp and send all messages within a time window or continuously over time has been overcome. The technique includes the use of logic or rules at each receiver, which may be applied to incoming replies and effectively filter out unnecessary and redundant replies.

These rules include such techniques as altitude filtering, Mode S, Mode A/C code filtering, and change filtering, where certain replies are accepted when they change state, which greatly decreases the number of replies to be time-stamped and sent to the central server while maintaining a sufficient number of time-stamped replies to match and provide high quality aircraft tracks.

The rules apply equally to active interrogation of targets as well as passive reception of any transponder equipped targets. The technique allows the bandwidth between the server and receiver to be managed to the point that commercial voice grade telephone lines may be used as the communications medium, greatly lowering the cost of ownership of a flight tracking system using triangulation or multilateration of transponder signals. Previous techniques had used high bandwidth communications such as fiber networks or T-1 lines.

Referring now to FIG. 7, as radar replies (e.g., transponder replies to radar interrogations) are received in step 730, the receiver decoder determines the type of reply in step 735 as Mode S/ADS-B or Mode A/C. Different types of radar reply formats are subjected to different logic and rules to compress the amount of information, as illustrated in FIG. 7.

In the Mode S channel 705, the formats are filtered based on type (i.e., Uplink Format #) in step 710 and unnecessary formats removed. The information may also be formatted within an altitude band, as illustrated in step 710. For example, in step 710, all formats from aircraft above 20,000 feet may be removed. Then redundant messages may be removed in step 715 using a combination of techniques which may include only forwarding those formats where the information changes, as illustrated in step 720. For example this includes an aircraft's descending altitude on approach. Also, the signal strength may be filtered in step 725 to remove certain values, effectively limiting the range of the system. Note that all of these filtering techniques may not be required, and any combination of one or more of the filtering techniques of the Mode S path of FIG. 7 may be used within the spirit and scope of the present invention.

In the Mode A/C channel 745, time windowing techniques may be used to effectively sample the asynchronous replies. Sampling 750 may be employed at a plurality of receivers, as all have access to a common accurate synchronization time source. The result may be an intelligently filtered set of radar data that allows multilateration of each aircraft target, but with redundant and unnecessary radar signals removed. As in the Mode S filtering path, the signal strength may be filtered in step 760 to remove certain values, effectively limiting the range of the system. Note that all of these filtering techniques may not be required, and any combination of one or more of the filtering techniques of the mode A/C path of FIG. 7 may be used within the spirit and scope of the present invention.

As illustrated in step 740, both Mode S and Mode A/C signals are now filtered for low bandwidth. Once radar return signals have been filtered as set forth in FIG. 7, the filtered signals may be sent to a central processor. Since the signals have been filtered, a high data bandwidth may be not required as in the Prior Art. A lower data bandwidth path (e.g., modem) may be used to communicate from the multilateration receivers and a central station, since much of the initial filtering has taken place in the remote receivers.

In a fourth embodiment of the present invention, tracking aircraft from radar or transponder signals provides a real-time picture of the aircraft's position as well as identification information. This picture may also be stored and replayed up to the current time for a variety of reasons including airport management and air traffic control. Aircraft positions may be tracked around the airport surface as well as in terminal and en route areas. Fusing ACARS data with this surveillance information adds a variety of other information including aircraft/pilot intent as well as other details.

For example, ACARS detects when a pilot/aircraft intends to depart from a gate, while the surveillance element determines when the aircraft actually pushes back from the gate. For those aircraft taxiing around on runway surfaces it may be difficult to determine whether an aircraft is departing or arriving at any instant in time based on the instantaneous surveillance position. However, intent may be readily identified from clearance messages provided by ACARS. If other pilots and airport users knew whether a plane was departing or arriving, they would have a better idea of the intentions and direction of travel of aircraft on the ground.

ACARS data, which indicates flight number and other aircraft and flight identification information may be fused with other data to show whether an aircraft is departing or arriving on an onboard or other type of aircraft position display. This data may be displayed on an in-cockpit display, ground display, or both. The system of the present invention may obtain such information as to arrival or departure from a variety of sources.

If the aircraft is tracked then the system knows if it landed and therefore may be labeled an arrival. If a tracked aircraft pushes back from a gate, the system knows it is a departure. In addition, this information may come from ACARS in the form of departure airport/arrival airport.

For example, if the ACARS data indicates the destination airport for a flight is Chicago, and the airplane is being tracked in the vicinity of Chicago, then it may be assumed the airplane is arriving. However, if the ACARS data indicates the destination airport for a flight is Chicago, and the airplane is being tracked in the vicinity of Newark, then it may be assumed the airplane is departing. Since ACARS flight information, as illustrated above, includes both origin and destination airports, either (or both) data may be used to determine whether an airplane is arriving or departing from a given airport.

Alternately, arrival or departure information may be inferred from source/destination data from flight plan information from an FAA database interface or from the FAA ASDI (aircraft situational awareness display to industry) which the industry has access to. The use of data base data or ASDI data may delay arrival/departure determination by a minute or so if such sources are used, as it takes time to download such data.

Figure 8:
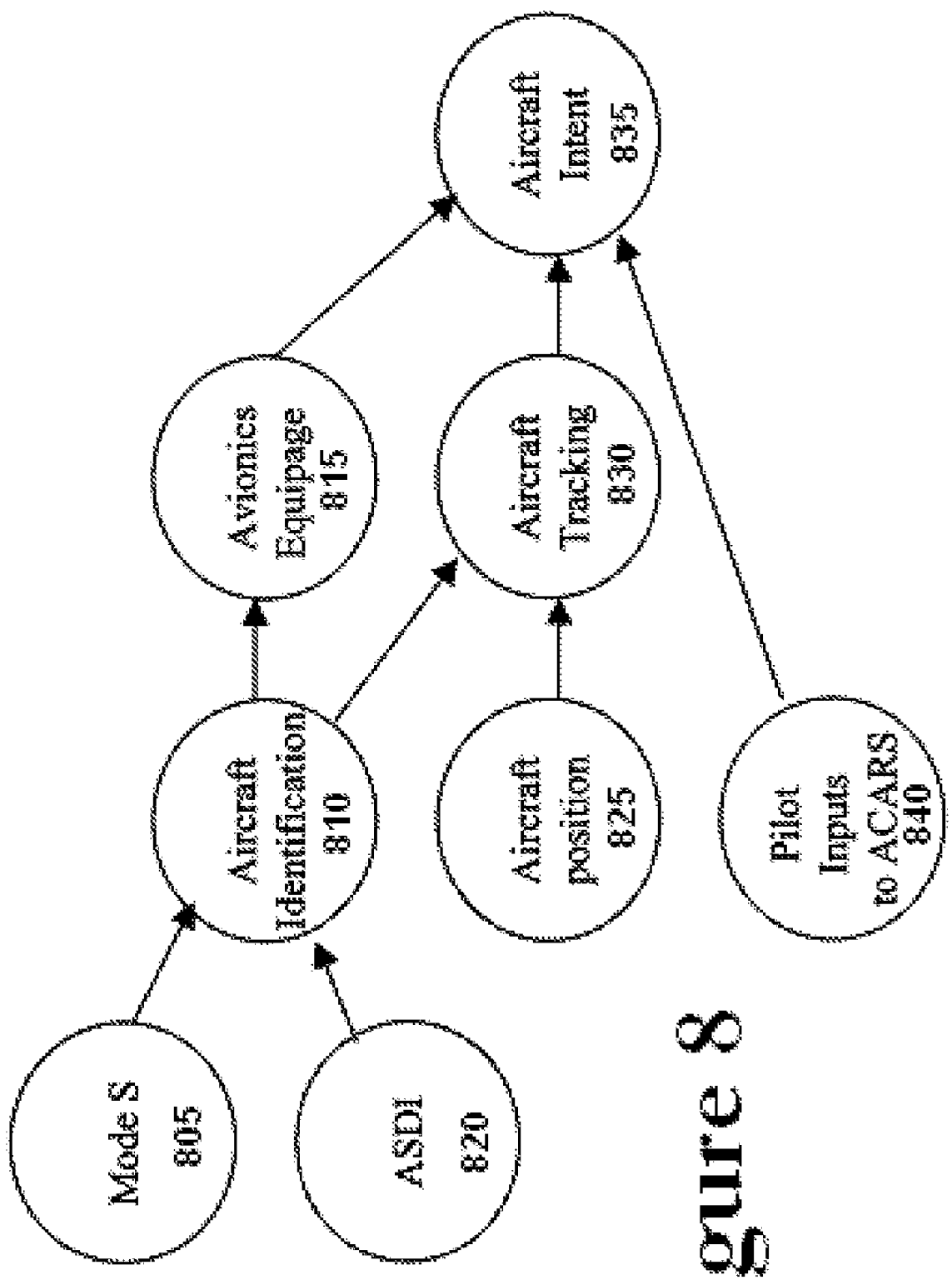
FIG. 8 is a flowchart illustrating the operating steps of the fourth and fifth embodiments of the present invention where tracking aircraft from radar or transponder signals provides a real-time picture of the aircraft's position as well as identification information, and the multilateration system provides accurate high update rate surveillance information on each target.

As illustrated in FIG. 8, an aircraft may be identified using Mode S (step 805) for airframe details or by flight number (step 820), from sources such as ASDI to produce aircraft identification 810. The aircraft may be tracked using multilateration, radar, or passive radar in step 825 to produce aircraft position data which in turn produces an aircraft track 830.

A database 815 may be used to determine the avionics and systems equipage on the aircraft, for example whether it has Category II/III landing system capability or a Flight Management System. As the pilot enters information into various systems in the cockpit, some of that information may then be broadcast over ACARS in step 840, effectively indicating pilot intent (For example, pushback from gate). From these various data sources, aircraft intent may be determined as illustrated in step 835.

In a first version of the fourth embodiment of the present invention, integration with ASDI may be provided. On its own, the multilateration portion of the present invention provides highly accurate aircraft tracks. Coverage may be dependent on the number and placement of the remote sensors. A large variety of information may be available from aircraft registration information which may be provided from a Mode S transponder code. The transponder-derived information includes such fields as aircraft make, model, type, serial number, owner, and engine type. In conjunction with other sources such as ACARS, other information may be available on the target such as flight number and aircraft/pilot intent.

The Aircraft Situational Display to Industry (ASDI) uses a data feed from the FAA's enhanced traffic management system, which includes surveillance and flight plan information for aircraft throughout the U.S. Near-real-time information on most aircraft with filed flight plans may be available from this source. When correlated with the other surveillance information, the ASDI source offers some additional information on targets such as flight plan destination and arrival airport.

ASDI provides near-real-time position data for aircraft across the U.S. and Canada. ASDI does not provide surface surveillance and does not provide full terminal area coverage in the vicinity of some airports. However, multilateration provides airport surface surveillance and terminal area surveillance where ASDI does not provide surveillance coverage. Fusing multilateration and ASDI surveillance provides gate-to-gate surveillance. Correlating the ASDI data with multilateration surveillance provides a means to obtain flight plan data for aircraft being tracked by the multilateration ground systems.

In another version of the fourth embodiment of the present invention, the multilateration surveillance system of the present invention may be used in place of the PASSUR system as disclosed by Dunsky et al. The data correlation and fusion process receives real-time aircraft position, altitude, speed and identification from the multilateration system. The identification data comprises of aircraft beacon code or Mode C code and Mode S address. Data may be time-stamped to identify the time that the update occurred. The data correlation and fusion process receives near-real-time (i.e., time delayed) aircraft position, altitude, speed and identification from ASDI. Data may be time-stamped to identify the time that the update occurred. ASDI typically has a data delay of about five minutes.

The data correlation and fusion process of the present invention forward-estimates the location and altitude of an ASDI tracked aircraft with the fixed delay removed. This forward estimation may be performed by determining or estimating the speed of the aircraft and then dividing the speed by the delay time to determine the difference in aircraft position. From the aircraft's reported flight track, the projected position can then be determined.

The data correlation and fusion process correlates the position, heading, altitude and speed of the multilateration target data and the forward estimate of the ADSI targets. A target tracked by both multilateration and ASDI will have similar position, heading, altitude and speed.

The Mode S address obtained from the multilateration system may be converted to tail number, which provides an indication of airline and/or country of registration. The data correlation and fusion process may compare airline and/or country of registration data provided by the Mode S address to the airline information provided by ASDI to confirm the data is correct. This comparison may be performed to increase confidence in the correlation of multilateration and ASDI targets. An ASDI track may be considered uncorrelated, if the track has not been correlated to a multilateration track.

Targets may be displayed in either real-time or near-real-time with the ASDI delay. The option of real-time or near-real-time may be user selectable. The correlation and fusion process performs the selection of displaying either the multilateration or ASDI tracks. In the real-time display, real-time multilateration tracks and forward-estimated uncorrelated ASDI tracks are displayed. In the near-real-time display, multilateration track updates that correspond to the time of the near-real-time ASDI target tracks are displayed along with the near-real-time uncorrelated ASDI tracks.

When multilateration tracks are correlated with ASDI tracks, the multilateration track may be displayed, as they represent the more accurate track. The associated ASDI track data for the correlated track may be not displayed. Uncorrelated ASDI track data which have no corresponding multilateration track may be displayed.

Multilateration and ASDI surveillance and flight information may be augmented with flight information provided by the airline flight information systems. An interface via the data correlation and fusion process and the airline flight information system may be implemented. Information, such as flight delays, boarding information, passenger information, boarding procedures, may be sent to the data correlation and fusion process for processing and display to systems users.

In a variation of the fourth embodiment of the present invention, the tracking system may be used to track ground vehicles around the surface areas of airport thereby building up a complete picture of all moving and stationary traffic around an airport ranging from service vehicles and catering trucks to emergency service vehicles. There are various solutions available for the tracking of ground vehicles only, and these rely on equipping the ground vehicle with some form of device, as vehicles (unlike aircraft) are not equipped with transmitting and identification devices anyway. Examples of vehicle tracking devices include http://www.racal-tracs.com/products/tdma.shtml However, it may be possible to treat the ground vehicles just like aircraft by equipping them with an aircraft-like device, such as a transponder, Mode A/C/SI or ADS-B. Then, all targets may be tracked and displayed on the same system. Otherwise if the vehicles are tracked using another technology, they may be fused into the aircraft display system to track all targets in the one system.

In a fifth embodiment of the present invention, the multilateration system provides accurate high update rate surveillance information on each target. The Mode S transponder derived information provides details on the aircraft type including registration which may be used to determine the avionics equipage in the aircraft. Further information may be available from the aircraft's ACARS messages and controller pilot data link communications (CPDLC). This information may be fused to provide a composite picture of aircraft flight states and in turn this may be used to drive flight simulation programs, such as the SimAuthor suite of programs (see http://www.simauthor.com).

Flight simulators are usually driven by information from the aircraft's onboard navigation and surveillance systems. However, based on the fusion of data collected passively from the aircraft, it may be possible to recreate many aircraft maneuvers, such as vertical descent rate and flight path, and response to a TCAS advisory.

In a sixth embodiment of the present invention, a method of correcting reported altitude from aircraft transponders based on pressure (barometric altitude) may be provided. Since pressure varies depending on local weather conditions, it may impact the performance of airport management systems that rely on precise altitude information, for example for billing for landing fees or collision avoidance systems.

The great variability in barometric pressure may have a significant impact on the performance of landing fee and billing systems and operations monitoring systems, unless they are corrected for non-standard barometric pressure through use of a correction factor from a pressure sensing device. Each tenth of an inch of mercury equates to approximately a 100' change in reported altitude. In the example data below, the barometric pressure changed from 30.57" to 29.09" in the course of one week, during a winter storm in the Washington D.C. area. This represents a change of 1.48" or 1480 feet in reported altitude.

Current Day Maximum Pressure—29.81 Inches
Current Day Minimum Pressure—29.61 Inches
Monthly Maximum Pressure—30.40 Inches Mar. 14, 2003
Monthly Minimum Pressure—29.57 Inches Mar. 2, 2003
Yearly Maximum Pressure—30.57 Inches Feb. 16, 2003
Yearly Minimum Pressure—29.09 Inches Feb. 23, 2003

In order for flight tracking systems to successfully track aircraft that are practicing takeoffs and landings in the traffic pattern, the system needs to be able to track aircraft from the surface up to about 800-1000 feet AGL, which may be typical traffic pattern altitude for single engine aircraft.

At municipal airports, where there may be interest to track Business Jets for billing purposes, this may be much less of an issue because their altitudes may be monitored over a wider (and higher) altitude range. Those business Jets typically takeoff, climb high, and leave the airport area. However, the same algorithms may not work for the typical Mode A/C light aircraft that may be staying in the traffic pattern doing takeoff and landing practice. The smaller aircraft need to be monitored over a much smaller altitude range, as little as 0-800' AGL. The algorithms require some minimum number of hits in order to qualify a list of altitudes as belonging to an aircraft.

At a typical municipal airport it was determined that eight different 100' altitudes were required out of the 1000' to 2000' altitude band (eleven 100' altitudes) to determine (with >80% certainty) if an aircraft ascended or descended through the band.

Assuming that only six 100' altitudes are needed to track targets in the traffic pattern, and assuming that the barometric pressure could easily attain 30.42", so that aircraft are reporting their altitudes 500' lower than if the local pressure was standard (29.92"). An aircraft that took off and climbed to traffic pattern altitude (800') would reply to Mode C interrogations with pressure altitudes of −500', −400', −300', −200', −100', 0', 100', 200' and 300'.

This, of course, assumes that the aircraft has line of sight to a radar or may be being consistently interrogated by TCAS from the surface to traffic pattern altitude. The algorithm may require that the aircraft transmit at least one of two lower altitude boundaries in order for a departure track to be initiated.

If these lower boundaries are set to 200' and 300' to insure a good chance that the aircraft may be high enough to be interrogated by a ground radar (assuming that there may be one not too far away) then this example aircraft would only transmit two possible altitudes to qualify it as a departure. This may be not even close to the six hits that were hypothesized as being required, and even farther from the eight that were found to be adequate at a typical municipal airport for the aircraft that climbed well above traffic pattern altitude as they departed.

Besides the weather, other things that may affect the system include an individual aircraft's altitude encoder calibration and the general SSR radar environment, including low altitude coverage from the nearest SSR and interrogations from nearby TCAS aircraft. Flight tracking may function well some of the time but may require a barometric correction to consistently perform well.

Figure 9:
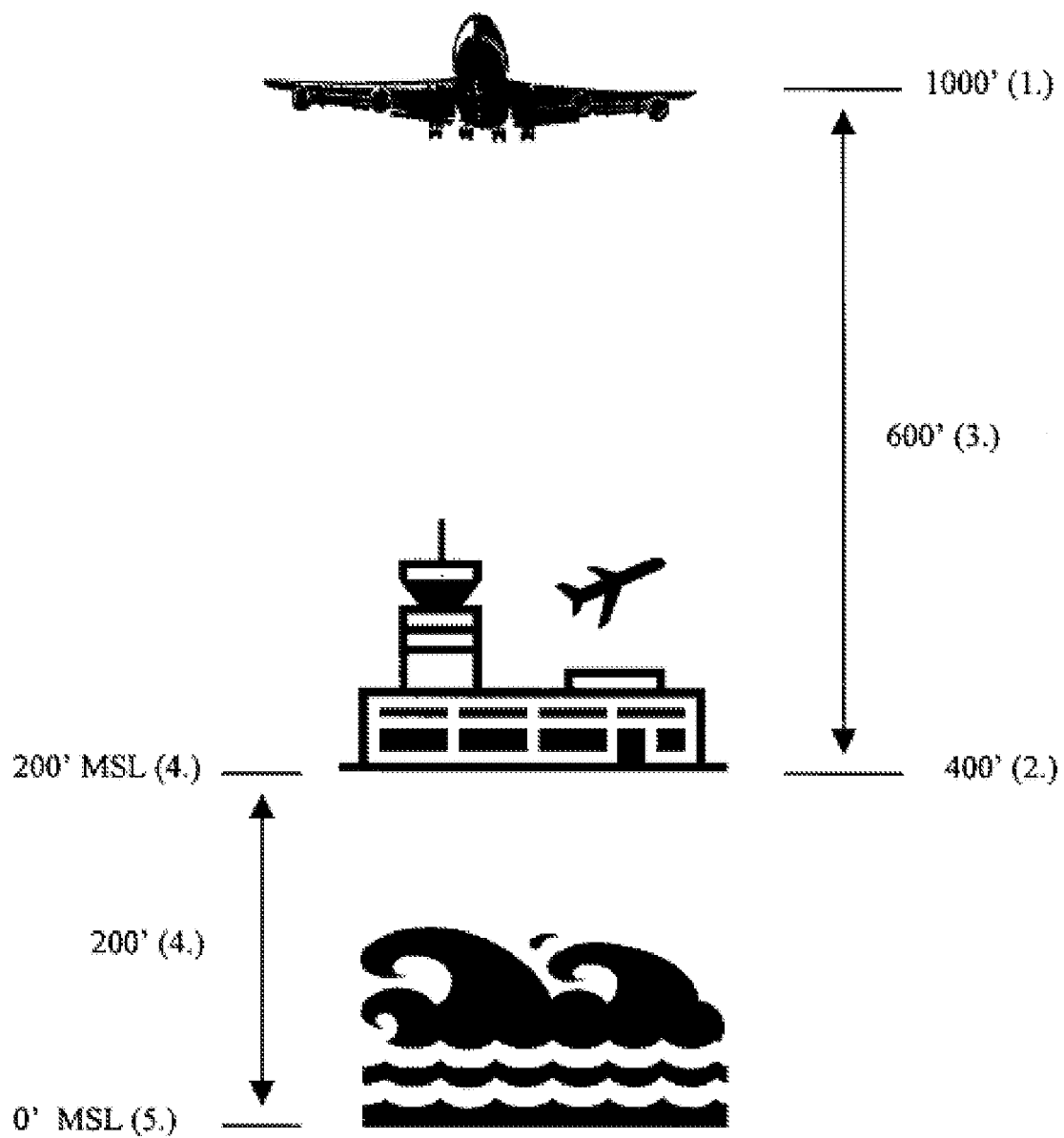
FIG. 9 is a diagram illustrating the altitude compensation technique of the sixth embodiment of the present invention.

FIG. 9 is a diagram illustrating the altitude compensation technique of the sixth embodiment of the present invention. The altitude reported from the aircraft's altitude encoder (1.) reports altitude based on a default transponder setting that assumes the current sea level pressure is 29.92" of Hg. Such a sea level pressure would rarely be the case, as weather systems are constantly affecting the atmospheric pressure.

FAA computers correct the altitude for any difference in sea level pressure from 29.92" Hg and then send the mean sea level (MSL) altitude to the controller's display. Controllers give updates to pilots on the local sea level pressure as the aircraft flies along. The pilot then sets this pressure setting on the altimeter, so that the controllers and pilots are both using MSL altitude.

However, the altitude encoder is separate from the altimeter, and always sends the aircraft's altitude based on the fixed, 29.92" Hg pressure setting. Although use of a fixed barometric calculation may produce inaccurate altitude readings, for air traffic control, this is not a problem, so long as all aircraft are using the same pressure setting—and reporting the same inaccuracy. Spacing between aircraft altitudes may still be maintained. Indeed, if the system relied upon pilots manually setting a barometric offset for transponder altitudes, the resultant reported altitudes could vary significantly if different pilots used different settings.

However, for accurately calculating flight track data from transponder encoded altitude information, a means of correcting for reported altitude inaccuracy must be found. To correct this error, altitude from a pressure sensor on the ground (2.) at the airport is collected based on the assumption that the sea level pressure is 29.92" Hg. In the present invention, the same type of pressure sensor and encoder (2.) is used as in the aircraft (1.) to insure that the two measurements have similar correlations. In this example, the "pressure altitude" on the ground at the airport, which assumes the sea level pressure is 29.92" Hg, is 400'.

The difference between (1.) and (2.) equals the altitude of the aircraft above the airport elevation. In other words, 1000'−400'=600'. This calculation is independent of actual barometric pressure, as the two pressure sensors, aircraft (1.) and ground (2.) are both of the same type and both calibrated to a default 29.92" Hg.

Now in this example, assume the actual altitude above sea level (5.) is 200 feet (4.). The altitude of the aircraft above sea level may be calculated as: 600'+200'=800'. Using this technique, actual aircraft altitude may be accurately determined based upon transponder altitudes, even though reported transponder altitudes may be inaccurate.

While the preferred embodiment and various alternative embodiments of the invention have been disclosed and described in detail herein, it may be apparent to those skilled in the art that various changes in form and detail may be made therein without departing from the spirit and scope thereof.

It should be noted that the present invention has been described in connection with the preferred embodiment. However, as one of ordinary skill in the art may appreciate, elements of the invention may be practiced individually or in various sub-combinations not including all of the elements of the preferred embodiment, and still fall within the spirit and scope of the present invention.

For example, in the preferred embodiment, position and identification information are obtained and displayed in an air traffic display. However, in alternative embodiments, only position or identification information may be obtained and displayed. Thus, for example, identification information may be obtained using the techniques of the present invention for use in identifying aircraft in the vicinity. Position information of such aircraft may not be required, or may be obtained using other techniques, including, but not limited to, conventional radar.

We claim:

1. A method for providing live display of in-flight aircraft position and flight information based on multilateration of aircraft radio signals, the method comprising the steps of:
   obtaining aircraft location and identification from multilateration of an aircraft transponder data source,
   obtaining aircraft data from at least one data source selected from:
      aircraft position and flight information from an ASDI (aircraft situational awareness display to industry) data source,
      flight information from an ACARS (Aircraft Communications Addressing and Reporting System) data source, and
      flight information from an airline flight information system data source,
   correlating aircraft data to integrate aircraft information from at least two of the data sources by correlating at least one non-position indicia from multilateration of the aircraft transponder data source with at least one non-position indicia from the at least one data source to produce integrated aircraft information, and
   providing a real-time display of the integrated aircraft flight information.

2. The method of claim 1, wherein said step of providing a live display comprises the step of providing a live display over a network.

3. The method of claim 1, wherein said step of providing a live display comprises the step of providing a live display via at least one physically connected display.

4. The method of claim 1, wherein said step of providing a live display comprises the step of providing a live display via at least one cockpit display.

5. The method of claim 1, further comprising the steps of:
   providing in at least one airport ground vehicle, a means for reporting identification,
   determining position and identification of the at least one airport ground vehicle,
   fusing airport ground vehicle identification and position data with the integrated aircraft information, and
   displaying position of the at least one airport ground vehicle on the display.

6. An apparatus for providing live display of aircraft flight information based on enhanced multilateration data, the apparatus comprising:
   a multilateration system for calculating aircraft location and identification from multilateration of aircraft transponder 1090 MHz transmissions,
   means for obtaining aircraft data from at least one data source selected from:
      aircraft position and flight information from ASDI (aircraft situational awareness display to industry), and
      flight information from ACARS ()Aircraft Communications Addressing and Reporting System);
   means for correlating aircraft data to integrate aircraft information from at least two data sources by correlating at least one non-position indicia from multilateration of the aircraft transponder 1090 MHz transmissions with at least one non-position indicia from the at least one data source to produce integrated aircraft information; and
   a display for displaying the integrated aircraft flight information in real-time.

7. The apparatus of claim 6, wherein the display comprises a display coupled to a network.

8. The apparatus of claim 6, wherein the display comprises at least one physically connected display.

9. The apparatus of claim 6, wherein the display comprises at least one cockpit display.

10. The system of claim 6, further comprising:
   means for reporting identification of at least one airport ground vehicle;
   means for determining position and identification of the at least one airport ground vehicle; and
   means for combining airport ground vehicle identification and position data with the integrated aircraft information,
   wherein the position of the at least one airport ground vehicle is displayed on the display.

* * * * *